United States Patent [19]
Magidson

[11] Patent Number: 5,452,410
[45] Date of Patent: Sep. 19, 1995

[54] APPARATUS AND METHOD FOR GRAPHICAL DISPLAY OF STATISTICAL EFFECTS IN CATEGORICAL AND CONTINUOUS OUTCOME DATA

[75] Inventor: Jay Magidson, Arlington, Mass.

[73] Assignee: SI Software Limited Partnership, Belmont, Mass.

[21] Appl. No.: 250,567

[22] Filed: May 27, 1994

Related U.S. Application Data

[63] Continuation-in-part of Ser. No. 228,071, Apr. 16, 1994.

[51] Int. Cl.$^6$ .............................................. G06F 15/00
[52] U.S. Cl. ..................................................... 395/140
[58] Field of Search ............... 395/133, 155, 161, 140; 345/133, 134, 135

[56] References Cited

U.S. PATENT DOCUMENTS 5,228,119  7/1993  Mihalisn et al. ..................... 395/118

OTHER PUBLICATIONS

Ishii–Kunts, Masako, *Oridinal Log–Linear Models*. Sage University Paper Series on Quantitative Applications in the Social Sciences, 1994.

Goodman, Leo A., "Measures, Models, and Graphical Displays in the Analysis of Cross–Classified Data", *Journal of the American Statistical Association*, vol. 86, No. 416, Dec. 1991, pp. 1085–1111.

Anderson, E. B., Comment to Goodman, *Journal of the American Statistical Association*, vol. 86, No. 416, Dec. 1991, pp. 1111–1112.

Benzécri, J. P., Comment to Goodman, *Journal of the American Statistical Association*, vol. 86, No. 416, Dec. 1991, pp. 1112–1115.

Baccini, A, Caussinus, H. and De Falguerolles, A., Comment to Goodman, *Journal of the American Statistical Association*, vol. 86, No. 416, Dec. 1991, pp. 1115–1117.

Clogg, C. and Rao, C. R., Comment to Goodman, *Journal of the American Statistical Association*, vol. 86, No. 416, Dec. 1991, pp. 1118–1120.

Cox, D. R., Comment to Goodman, *Journal of the American Statistical Association*, vol. 86, No. 416, Dec. 1991, pp. 1121.

Haberman, Shelby J., Comment to Goodman, *Journal of the American Statistical Association*, vol. 86, No. 416, Dec. 1991, pp. 1121–1123.

Goodman, Leo A., Rejoinder, "New Methods in the Age of Process in Contingency Table Analysis Using Measures, Models, and Graphical Displays", *Journal of the American Statistical Association*, vol. 86, No. 416, Dec. 1991, pp. 1124–1138.

Duncan, O. D. and McRae, J. A., "Multiway Contingency Analysis with a Scaled Response or Factor", *Sociology Methodology*. 1979, pp. 68–85.

Clogg, C. and Shihadeh, E., *Statistical Models for Ordinal Variables*. Advanced Quantitative Techniques in the Social Sciences Series, Sage Publications, 1994.

Advertising material regarding TempleMVV, Feb. 1994.

*Primary Examiner*—Phu K. Nguyen
*Attorney, Agent, or Firm*—Bromberg & Sunstein

[57] ABSTRACT

Apparatus and methods are provided for creating a novel class of graphical displays of statistical effects in categorical and continuous outcome data. Each display is provided from a user-selected reference perspective. The effects are estimated from a class of "M-component" models, $M \geq 1$. The resulting displays allow researchers to visualize and readily interpret the effects of their data.

26 Claims, 17 Drawing Sheets

APPARATUS AND METHOD FOR GRAPHICAL DISPLAY OF STATISTICAL EFFECTS IN CATEGORICAL AND CONTINUOUS OUTCOME DATA

This invention was made with government support under grant number 1 R43 CA61507-01 awarded by the National Institutes of Health. The government has certain rights in the invention.

DESCRIPTION

This application is a continuation in part of U.S. application Ser. No. 08/228,071, filed Apr. 16, 1994. This related application is hereby incorporated herein by reference.

TECHNICAL FIELD

The present invention relates to apparatus and methods for achieving statistical analysis of categorical and continuous outcomes and for displaying the results of such analyses.

BACKGROUND ART

Statistical analysis has addressed the problem of estimating the effects of various conditions on different types of outcomes. As discussed below, in the case of a categorical outcome, the prior art has not produced a concise and informative display of these effects.

The simple linear regression model fits a straight line to a continuous outcome as a function of some predictor variable. The graphical display of the straight line makes obvious the statistical effect of the predictor on the outcome.

When the outcome is not continuous but contains say J categories, there is a multiplicity issue in that there are $J-1$ possible effects of a continuous predictor variable on the outcome, or, for a categorical predictor containing I categories or conditions, as many as $(I-1)*(J-1)$ possible effects. See, e.g., Clogg and Shihadeh (1994), which is hereby incorporated herein by reference, at page 17. The potentially large number of effects makes it difficult to create a concise yet informative graphical display for this situation. Moreover, there are several competing statistical models for describing effects on categorical outcomes.

Duncan & McRae (1979) described an important class of models for a categorical outcome and presented some graphical displays for these models. However, these displays show odds and odds ratios pertaining only to the predictor variables and do not relate to the effects of the predictor variables on the outcome variable(s), and hence have no appeal as a display of effects.

Goodman (1991), which is hereby incorporated herein by reference, summarized the current state of development for these and similar models for two categorical cross-classified variables (i.e., a row variable and a column variable), and suggested certain models for more than two variables. Some of the models impose a fixed spacing between the rows (and/or columns) while others include "spacing parameters" which allow the spacing to be estimated from the data. Goodman also commented on a plot of certain transformations of observed data that can assist the statistician in determining which type of model may provide a good fit.

In addition to the multiplicity issue mentioned above, Goodman (1991) pointed out that none of the effects from these models are unique in that they are subject to certain identifying standardizations. He illustrated the use of two such standardizations. The first, which he called the unweighted average standardization, assigns equal weight to each row and also weights each column equally. The second, which he called the weighted average standardization weights each row proportionate to the total frequency count for that row and weights each column proportionate to the total frequency count for that column.

Since the important class of models discussed above are relatively new and continue to evolve, only a few of these models can be estimated at all with current computer programs. For those models that can be estimated by current computer programs, the use of the programs is complex and the interpretation of results is especially difficult. In a new book on these models, it is pointed out (Ishii-Kuntz, 1994, p. 11) that for the few models that can be currently estimated, not only do the current computer programs not display interpretable effects (i.e., "odds ratios") graphically, but most do not output them at all. Rather, they output in tabular form logarithmic transformations of the interpretable effects.

An important goal of researchers who analyze a categorical outcome is to use statistical models to identify and describe effects in their data and to obtain a clear interpretation of these effects. The goal of fitting a model to categorical outcome data and obtaining a useful display of the effects is complicated by the general multiplicity issue, the availability of a wide range of possible models, and the necessity for using an unweighted or weighted standardization or some other kind of standardizing restriction(s) to identify and define these effects. Accordingly, there is a need for a concise and informative display of the effects of various conditions (i.e., predictors) on a categorical outcome.

SUMMARY OF INVENTION

The invention solves this problem in the prior art by providing a device and method for the display of the effects of various conditions on a categorical or continuous type of outcome. The invention provides such a display from a user-selected reference perspective. The effects are estimated from a class of "M-component" models. The resulting displays allow researchers to visualize and readily interpret the effects in their data.

For 1-component models (or for single components from multi-component models), the display in a preferred embodiment of the invention corresponds to several straight lines (the "effect lines"), which intersect at the user-defined reference point. Optionally, vertical and horizontal reference lines which also intersect at the reference point may be added to the display to depict the user-selected outcome and condition references, respectively, for additional guidance in interpreting the effects. The reference lines represent standardizing restrictions that are necessary to identify and define the model effect parameters. For categorical outcomes, the ith effects line represents the effects of condition $C_i$ on each outcome event $E_j$, $j=1,2,\ldots,J$ from the perspective of the user-selected references ("the reference point").

For M-component models M separate linear plots (the 1-component plots) may be displayed. Alternatively (or in addition to the 1-component plots), plots for 2 or more components may be displayed. For 1-component models (or for single components from multi-component models) the linear display can be enhanced by the addition of projections of each condition onto the outcome space. Such projections represent absolute measures of effect of each condition (i.e., the "expected" outcome) which complement the effects lines that define the effects relative to the outcome and condition references. In the case of a 1-component model based on a multivariate conditioning variable $C=[C(i_1), C(i_2), \ldots, C(i_K)]$, a separate "partial" effects plot can be displayed for any single conditioning variable $C(i_k)$, $i_k=1,2,\ldots,I_k$.

Both 1-component and M-component (M>1) displays can be enhanced further by adding observed effects (and/or effects attainable under some other model). By superimposing the observed effects (as well as, optionally, effects estimated under different model assumptions) onto the plot, the display becomes a framework for judging whether the selected model provides an adequate fit to the data. To the extent to which the observed effects are close to the corresponding effects line, the model fits the data. This approach to visualizing the degree of model fit represents a substantial improvement over the current approach for a categorical outcome of simply plotting certain transformations of the observed data.

For a continuous outcome, observed effects are defined for grouped intervals of the continuous outcome. As a supplement to the traditional plot of the regression line, the new plot provides a more focused view of the effects as well as an important diagnostic capability for both the traditional regression as well as new entropy-based regression models.

Through numerous examples, we illustrate the invention primarily in the Y-View, where markers for the outcome are displayed parallel to the horizontal axis. In FIGS. 7 and 9 and again in FIGS. 8 and 10, we show both the Y-View and X-View for the same data. In the X-View, markers for the conditions are displayed parallel to the horizontal axis. Since the calculations for creating the X-View effects lines are identical to that for creating the Y-View effects lines, for simplicity we limit the discussion primarily to the Y-View (which can be enhanced by the inclusion of the projections associated with each condition). The X-View is created simply by transposing the rows and columns in the input data matrix, prior to beginning the calculations.

The primary advantage of the X-View is that it is consistent in orientation with the traditional plot of the simple regression line where the conditioning variable (i.e., "predictor variable, X") is displayed along the horizontal or X-axis. In the case of a 1-component model based on a multivariate conditioning variable $C=[C(i_1), C(i_2), \ldots, C(i_K)]$, each condition marker (displayed parallel to the horizontal axis), represents a multivariate condition. For example, in the case of the Duncan data displayed in Y-View in FIG. 13, in the case of an X-View, separate markers would be present for 1959 Whites, 1959 Blacks, 1971 Whites and 1971 Blacks, and these four markers would be ordered along the horizontal axis appropriately as determined by the statistical model.

Suppose that C is a continuous multivariate conditioning variable, say $C=X$, where for example $K=2$, $X=(X_1, X_2)$. In this case, each horizontal marker is associated with a selected $(x_1, x_2)$ point, where $x_1$ and $x_2$ are each measured in standard score units (i.e., $X_1$ and $X_2$ are standardized to have mean 0 and standard deviation 1). Since there are an infinity of $(x_1, x_2)$ points that could be displayed when X is continuous, the user would select the particular points to be displayed. For example, a standard display might include markers for $(-1,-1)$, $(-1,0)$, $(-1,1)$, $(0,-1)$, $(0,0)$, $(0,1)$, $(1,-1)$, $(1,0)$, and $(1,1)$. See FIG. 23 for an example of an effects plot based on a continuous outcome and a continuous conditioning variable.

DETAILED DESCRIPTION OF SPECIFIC EMBODIMENTS

Figure 1:
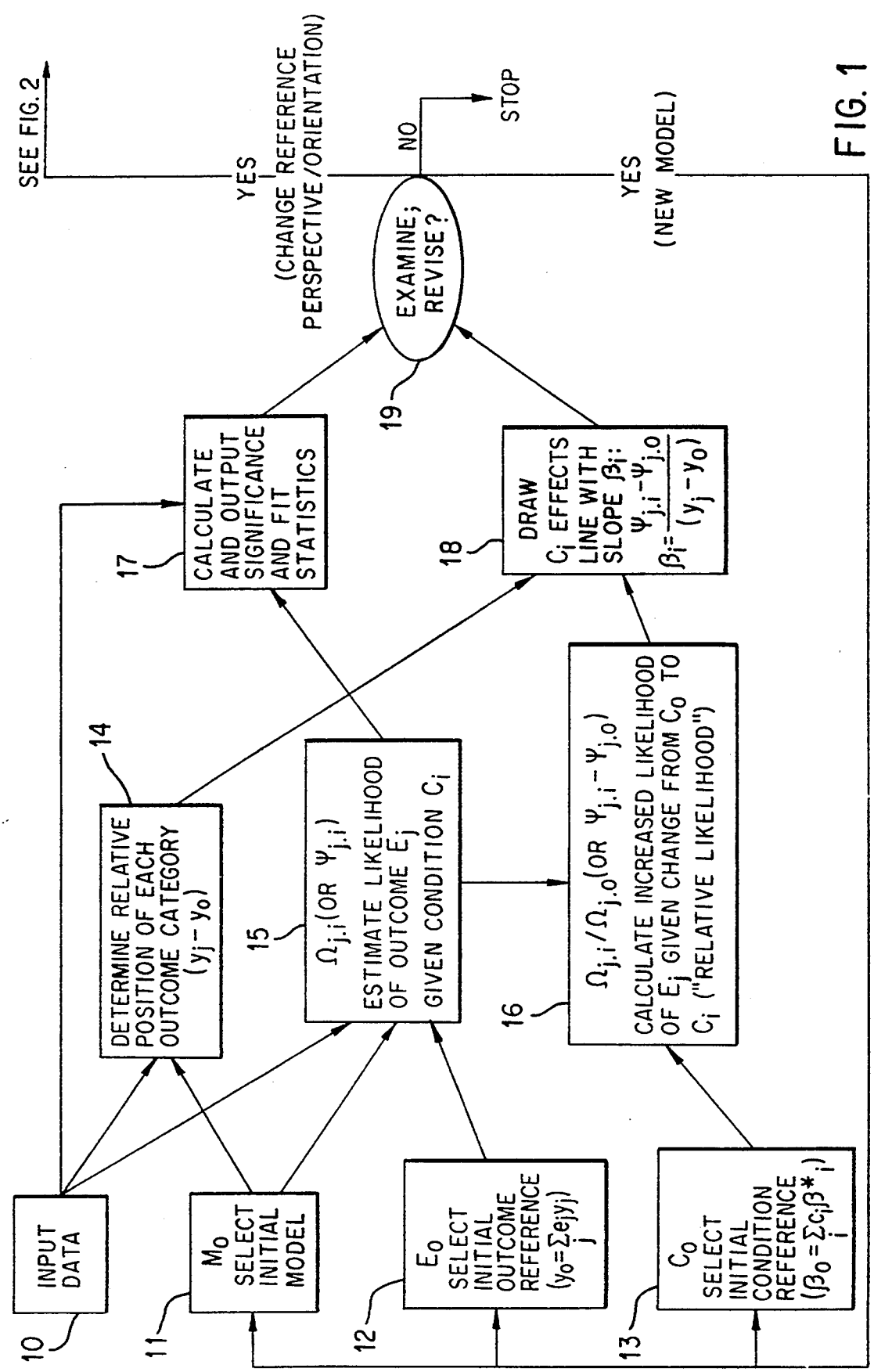
FIGS. 1-2: Steps for 1-Component Plots

The invention consists of a computer that takes any input that associates observed outcomes $E_j$ ($j=1,2,\ldots,J$) with condition $C_i$ and provides as output a graphical display describing the statistical effects of $C_i$ on the outcome that are estimated under a user-selected model. When the user selects the outcome and condition reference perspectives, the display produces effects that are interpretable from these perspectives (the "reference point") along with diagnostic information about the model and the statistical significance of the results.

The invention relies on the discovery of a general effects plotting methodology where effects are estimated under the assumptions of an "M-component" model, where M is a positive integer representing the dimensionality of the model. As preferred embodiments, the model is selected from the class of association models (see e.g., Goodman, 1991). The invention may be implemented in one embodiment in a program written in C++ and run on an INTEL 386 computer. The invention also relies on a generalization of the notion of probability, called "likelihood". For a categorical outcome, the models estimate the effects of the conditions $C_i$ (or of a continuous conditioning variable X) on the likelihood of outcomes $E_j$ ($j=1,2,\ldots,J$). For a continuous outcome, Y, the models estimate the effects of $C_i$ (or X) on the likelihood or $Y=y$.

The effects themselves are measures of "relative likelihood", which are displayed in the effects plot relative to the user-selected reference point. For the purposes of this description and the following claims, the terms likelihood, conditional likelihood and relative likelihood are defined as follows:

Definition of likelihood

Probability is the most commonly used method for assessing the likelihood of some outcome event $E_j$. The probability of $E_j$, denoted $P_j$, falls between 0 and 1. $P_j=0.5$ means the event is as likely to occur as not. The "not" comparison is implicit in the definition of probability (i.e., probability is "centered" at 0.5). $P=0.6$ means somewhat more likely than not, 20% more likely to be precise. But probability is not the only possible measure for the likelihood of an event.

Consider J mutually exclusive and exhaustive outcomes $E_j$ (j=1,2, . . . ,J), where $P_j$ denotes the probability of the occurrence of $E_j$, where $$P_j \geq 0, \text{ and } \sum_{j=1}^{J} P_j = 1$$

Then $\Psi_j$ (j=1,2, . . . ,J) measures the likelihood of $E_j$ if and only if $\Psi$ imposes the same ordering on E as does P. That is, for any pair of outcomes $E_j$ and $E_{j'}$, if $P_j > P_{j'}$ then $\Psi_j > \Psi_{j'}$, if $P_j = P_{j'}$, then $\Psi_j = \Psi_{j'}$ and if $P_j > P_{j'}$, then $\Psi_j > \Psi_{j'}$. For example, $\Psi_j = P_j - 0.5$ meets the above definition of a likelihood measure, in which case a positive value means that the event is more likely to occur than not, while a negative value means less likely to occur than not (i.e., the center is now 0). Note that the use of this generalized definition of likelihood frees the measure so that it need not sum to one or to any finite quantity.

More generally, if $G_j$ is a likelihood measure, then $\Psi_j = G_j - G_0$ is also a likelihood measure, for some constant $G_0$, which itself assesses the likelihood for some outcome reference, $E_0$. The $G_0$ term in $\Psi_j$ is used as a centering reference to help clarify the interpretation of the likelihood of $G_j$. $G_0$ centers the likelihood at $E_0$ (i.e., $\Psi_0 = 0$). Consider $G_0$ defined as follows:

$$G_0 = \sum_{j=1}^{J} e_j G_j, \quad (1)$$

where $e_j$ (j=1,2, . . . ,J) is such that $$e_j \geq 0, \sum_{j=1}^{J} e_j = 1, \quad (2)$$

and $$G_j = \ln P_j. \quad (3)$$

Note that $G_j = \ln P_j$ is a likelihood measure since the natural logarithm is a monotonic function over the range 0–1.

There are many ways to choose $G_0$ to center the likelihood. For example, one approach is to take $e_1 = e_2 = \ldots = e_{J-1} = 0$ and $e_J = 1$. This yields $\Psi_j = \ln P_j - \ln P_J = \ln(P_j/P_J)$ which represents the log-odds in favor of outcome $E_j$ (over outcome $E_J$). As a preferred embodiment, $e_j = P_j$.

$$\Psi_j = \ln P_j - \sum_{k=1}^{J} P_k \ln P_k = \ln[(P_j/P_0)], \quad (4)$$

$$\text{where } P_0 = \prod_{k=1}^{J} P_k^{P_k} \quad (5)$$

In this case, $\Psi_j$ represents a generalized log-odds in favor of $E_j$ over $E_0$=the "average" outcome, where average is defined by the geometric mean of the probabilities. It is also a measure of entropy (see e.g., Madison, 1981).

A multiplicative version of the above likelihood in terms of generalized odds (rather than log-odds) is $\Omega_j = P_j/P_0$. For notational clarity, we will reserve the symbol $\Omega$ for a multiplicative likelihood measure (e.g., odds-based) as opposed to additive (e.g., log-odds based).

For a continuous variable Y, the probability density for Y itself is a measure of likelihood despite the fact that the probability of any particular value is zero. Thus, we shall use the symbol $P_Y(y)$ to denote the probability density function for a continuous variable Y associated with the event Y=y. In this case, as a preferred embodiment, we center the likelihood at the mean ($\mu_Y$), by subtracting $P_Y(\mu_Y)$ to obtain $\Psi_Y(y) = P_Y(y) - P_Y(\mu_Y)$ as the measure of likelihood.

In summary, $\Psi_j$ is a measure of the likelihood of categorical outcome $E = E_j$, if it has a monotonic relationship with the probability $P_j$. Similarly, $\Psi_Y(y)$ is a measure of likelihood if and only if $\Psi_Y(y)$ is a monotonic transformation of the probability density function $P_Y(y)$.

Definition of conditional likelihood

Let $P_{j,i}$ denote the conditional probability of $E_j$ given condition $C_i$. Then $G_{j,i}$ is the conditional likelihood of outcome $E_j$ (given condition $C_i$) if $G_{.i} = (G_{1.i}, G_{2.i}, \ldots, G_{J.i})$ has a monotonic relationship with $P_{.i} = (P_{1.i}, P_{2.i}, \ldots, P_{J.i})$. As earlier, $G_{0.i}$ is chosen by specifying 3 $e_j$ (j=1,2, . . . ,J) for centering the conditional likelihood:

$$G_{0.i} = \sum_{j=1}^{J} e_j G_{j.i}$$

where again $e_j$ is such that $$e_j \geq 0 \ (j=1, 2, \ldots J) \text{ and } \sum_{j=1}^{J} e_j = 1.$$

As a preferred embodiment, we again take $e_j = P_j$. That is, $\Psi_{j.i} = \ln(P_{j.i}/P_{0.i})$, where $$P_{0.i} = \prod_{j=1}^{J} P_{j.i}^{P_j}$$

The multiplicative form of the conditional likelihood will be denoted as $\Omega_{j.i}$.

For continuous variables Y and X, the conditional likelihood of Y given X=x, is defined by $\Omega_{Y.X} = P_{Y.X}(y,x)/P_{Y.X}(y_0,x)$, and $\Psi_{Y.X} = \ln(\Omega_{Y.X})$.

As a preferred embodiment, $P_{Y.X}$ is taken to be the bivariate normal density, and $y_0 = \mu_Y$, the mean of Y, as estimated by the sample mean.

If the conditioning variable is categorical, we use the notation $C_i$ (i=1,2, ..., I) in place of x and we will express the conditional likelihood as $P_{Y,i}(y)/P_{Y,i}(y_0)$.

Definition of relative likelihood

Let $\Psi_{j,i}$ denote some conditional likelihood and $G_{j,0} = G_{j,0} - G_{0,0}$ denote some baseline likelihood associated with some condition reference $C_0$ $$G_{j,0} = \sum_{i=1}^{I} c_i G_{j,i}, \ G_{0,0} = \sum_{i=1}^{I} c_i G_{0,i} = \sum_{i}^{I}\sum_{j}^{J} c_i e_j G_{ij}$$

where $$c_i > 0 \text{ and } \sum_{i=1}^{I} c_i = 1$$

Then $\Psi_{j,i} - \Psi_{j,0} = (G_{j,i} - G_{0,i}) - (G_{j,0} - (G_{0,0})$ represents the change in the conditional likelihood of outcome $E_j$ associated with a change from the condition reference $C_0$ to condition $C_i$. Such a change is called the "relative likelihood" of outcome $E_j$ (relative to $C_i$). Preferred embodiments for the relative likelihood are the odds ratio and the rate 1) the odds ratio is $$\theta_{j,i} = \frac{P_{j,i}/P_{0,i}}{P_{0,i}/P_{0,0}}$$

The additive form of the odds ratio can be expressed as:

$$\Phi_{j,i} = \ln(P_{j,i}/P_{0,i}) - \ln(P_{j,0}/P_{0,0})$$

$$= \ln(P_{j,i}/P_{j,0}) - \ln(P_{0,i}/P_{0,0})$$

A preferred embodiment for the continuous case is $G_{Y,X} = \ln P_{Y,X}$ where $P_{Y,X}$ is the probability density for the bivariate normal distribution (See Algorithm section). As shown later, it follows that $\Psi_{Y,X}(y,x) - \Psi_{Y,X}(y,x_0) = \phi(x-x_0)y - y_0)$, where $\phi = (\rho/1-\rho^2)$ under bivariate normality.

2) For rates, we have $(F_{ij}/Z_i)/F_{0j}/Z_0)$, where $F_{ij}$ represents the expected frequency of outcome $E_j$ for condition $C_i$, and $Z_i$ is a measure of exposure for the conditions. As a preferred embodiment, $F_{0j} = F'_j$ and $Z_0 = Z'_i$ for some "baseline" condition $C_0 = C'_i$. Take $P_{j,i} = F_{ij}/Z_i$ and $P_{0,i} = F_{0j}/Z_0$ in this case. $Z_i$ and $Z_0$ are used as starting values in the estimation algorithm (see e.g., Clogg and Eliason, 1987).

Option A: Calculate expected outcome score for each condition $C_i$ and add to display.

For a categorical outcome, and a categorical condition the projection of $C_i$ will be denoted by $y_{j,i}$. Separate projections for each component m of the model will be denoted by $y_{jm,i}$, where $$y_{j,i} = \sum_{m=1}^{M} y_{jm,i}$$

For a categorical outcome and continuous conditioning variable X, we will denote the projections by $y_{jm,x}$ and $y_{j,x}$. For a continuous outcome Y, the notation becomes $y_{m,x}$ and $y_{,x}$ or $y_{m,i}$ and $y_{,i}$ respectively depending upon whether the condition is continuous or categorical.

Thus $$y_{j,x} = \sum_{m=1}^{M} y_{jm,x}, y_{,x} = \sum_{m=1}^{M} y_{m,x}, \text{ and } y_{,i} = \sum_{m=1}^{M} y_{m,i}$$

The first preferred embodiment utilizes an approach referred to here and in the following claims as the model-based expectation. This approach is as follows: To calculate the projections for a categorical outcome component associated with a particular condition calculate $$y_{m,i} = \sum_{j=1}^{J} (\Psi_{j,i} - \Psi_{j,0}) P_j(y_j - y_0)$$

(see Goodman, 1991, eq. A.2.11 on page 1107). Similarly, for a continuous outcome, we have $$y_{,x} = -[\Psi_{Y,X}(y,x) - \Psi_{Y,X}(y,x_0)] P_Y(y)(y - y_0) dy$$

where $x_0$ and $y_0$ are taken as the sample means of X an Y respectively. The second preferred embodiment, is the conventional probability based conditional expectation. For example, $$y_{jm,i} = \sum_{j=1}^{J} P_{j,i} y_{jm}$$

$$y_{jm,x} = \sum_{j=1}^{J} P_{j,x} y_{jm}$$

where the $P_{j,i}$, $P_{j,x}$, $y_{jm}$ and other parameters are estimated from the model.

In general, the conventional probability-based projections will be used. However, in the case that the y-score displayed in the plot is transformed by multiplying it by some quantity J, and the slope of the line being plotted is transformed by dividing it by the same quantity J, the model-based projections will be appropriate. However, before using the model based projections for the y-scores, they will need to be multiplied by some quantity J' such that the standard deviation of the projected y-scores equals the standard deviation of the transformed y-scores.

Option B: Calculate observed points or points from other models and add to display.

An overview of the steps required to produce the effects plot for categorical outcome data using a 1-component association model (or for a single component from an M-component association model) is illustrated in FIG. 1. Blocks 10-14 refer to the data input and initial selections used to customize the plot. Blocks 15-17 pertain to the calculations required to produce the effects plot and related statistics. Block 18 pertains to the drawing of the lines that constitute the effects plot. Block 19 addresses revisions to the effects plot associated with a different orientation or the use of a different model (see also FIG. 2).

These steps are described in detail below for the simplest data situation where there are only I=2 conditions and J=2 outcome events and hence only a single effect exists, i.e., (I−1)(J−1)=1. More complex examples are used to illustrate more general displays and enhanced displays which also contain observed effects and projections added to the display.

BLOCK 10: Input Data

For concreteness, suppose that patients are exposed to one of the two possible conditions, $C_1$=test drug, $C_2$=placebo, and the following two outcome events are possible: $E_1$=no change, $E_2$=improvement. For this example, sample input data may be given in the form of a 2×2 matrix where the entry for cell (i,j) is the corresponding frequency count of patients $f_{ij}$, such as that given in Table 1.

Table 1: A 2×2 matrix of frequency counts of patients according to post-treatment outcome (no change vs. improvement) and treatment condition (placebo vs. test drug):

|  | CONDITION | OUTCOME | |
|---|---|---|---|
|  |  | No Change | Improvement |
| $C_1$ | test drug | 13 | 28 |
| $C_2$ | placebo | 29 | 14 |

Alternatively, the same data might be input in the form of N=84 case level observations where the row and column indices are specified:

| | |
|---|---|
| 1 | 1 |
| 1 | 2 |
| 1 | 2 |
| 1 | 2 |
| 2 | 1 |

... etc. or, as a reduced number of cases where the row and column indices are followed by the frequency count:

| | | |
|---|---|---|
| 1 | 1 | 13 |
| 1 | 2 | 28 |
| 2 | 1 | 29 |
| 2 | 2 | 14 |

The following is input data for a bivariate conditioning variable $C(i_1)$, $C(i_2)$ and a categorical outcome:

| Year | Race | Response | Frequency |
|---|---|---|---|
| 1 | 1 | 1 | 81 |
| 1 | 1 | 2 | 23 |
| 1 | 1 | 3 | 4 |
| 1 | 2 | 1 | 325 |
| 1 | 2 | 2 | 253 |
| 1 | 2 | 3 | 54 |
| 2 | 1 | 1 | 224 |
| 2 | 1 | 2 | 144 |
| 2 | 1 | 3 | 24 |
| 2 | 2 | 1 | 600 |
| 2 | 2 | 2 | 636 |
| 2 | 2 | 3 | 158 |

Continuous outcome data may be input in several different forms. For example, the following is some sample input data for the analysis of child's height as an adult as a factor of the average height of the parent:

| Parents | Children |
|---|---|
| 73.5 | 72.2 |
| 73.5 | 73.2 |
| 72.5 | 68.2 |
| 72.5 | 69.2 |
| 72.5 | 70.2 |
| 72.5 | 71.2 |
| 72.5 | 72.2 |
| 72.5 | 73.2 |
| 72.5 | 74.2 | etc.

The following is survival rate data containing number of fatalities and number of patients exposed to a heart valve replacement operation given the conditions age (1=young, 2=old) and type of operation (1=aortic, 2=mitral valve):

| Age | Operation | Deaths | Exposed |
|---|---|---|---|
| 1 | 1 | 4 | 1259 |
| 1 | 2 | 1 | 2082 |
| 2 | 1 | 7 | 1417 |
| 2 | 2 | 9 | 1647 |

The following notation and formulae for association models is used throughout:

$C_i$=ith condition;
i=1,2, . . . ,I
$E_j$=jth outcome event;
j=1,2, . . . ,J;
$C_0$=condition reference (weighted average of the $C_i$)
$E_0$=outcome reference (weighted average of the $E_j$);
$c_i$=nonnegative weight for condition $C_i$
$e_j$=nonnegative weight for outcome event $E_j$;
e=$(e_1,e_2, \ldots, e_J)'$ where $$\sum_{i=1}^{I} c_i = \sum_{j=1}^{J} e_j = 1$$

$y_j$=score associated with outcome event $E_j$;
y=$(y_1,y_J)'$
$y_0$=score associated with outcome reference $E_0$ $$y_0 = e'y = \sum_{j=1}^{J} e_j y_j$$

$x_i$=optional score associated with condition $C_i$
$x_0$=(optional) score associated with condition reference $C_0$
N=total number of sample observations;
$N_{i+}$=number of sample observations for $C_i$;

$$\sum_{i=1}^{I} N_{i+} = N$$

$f_{ij}$=observed frequency associated with cell (i,j), i.e., associated with condition $C_i$ and outcome event $E_j$ (e.g., $f_{12}$=28 for sample 2×2 matrix)
$P_{j,i}=f_{ij}/N_{i+}$=observed proportion associated with $E_j$, conditional on $C_i$
$P_{j,i}$=unknown population probability associated with $E_j$, conditional on $C_i$
$F_{ij}=N_{i+}P_{j,i}$=expected frequency associated with cell (i,j)

$$P_{0,i} = \prod_{j=1}^{J} (P_{j,i})^{e_j} = \text{reference probability for condition } C_i$$

$$F_{i0} = \prod_{j=1}^{J} (F_{ij})^{e_j} = N_i P_{0,i} = \text{expected reference frequency associated with condition } C_i$$

$$P_{j,0} = \prod_{i=1}^{I} (P_{j,i})^{c_i} = \text{reference probability for outcome event } E_j$$

-continued $$P_{0,0} = \prod_{i=1}^{I} \prod_{j=1}^{J} (P_{j,i})^{c_i e_j} = \text{reference probability for each cell } (i,j)$$

$$F_{0j} = \prod_{i=1}^{I} (F_{ij})^{c_i} = \text{expected reference frequency associated with outcome event } E_j$$

$$F_{00} = \prod_{i=1}^{I} \prod_{j=1}^{J} (F_{ij})^{c_i e_j} = \prod_{j=1}^{J} (F_{0j})^{e_j} =$$

$$\prod_{i=1}^{I} (F_{i0})^{c_i} = \text{expected reference frequency associated with each cell } (i,j)$$

$$\Omega_{j,i} = (P_{j,i}/P_{0,i}) = F_{ij}/F_{i0} = \text{baseline odds } E_j{:}E_0 \text{ conditional on } C_i$$

$$\Omega_{j,0} = (P_{j,0}/P_{0,0}) = F_{0j}/F_{00} = \text{baseline odds } E_j{:}E_0 \text{ conditional on } C_0$$

$$\frac{\Omega_{j,i}}{\Omega_{j,0}} = \frac{(P_{j,i}/P_{0,i})}{(P_{j,0}/P_{0,0})} = \text{baseline odds ratio (multiplicative effects of } C_i\text{: increase in baseline odds given change from } C_0 \text{ to } C_i)$$

$$\Psi_{j,i} = \ln(P_{j,i}/P_{0,i}) = \text{logarithm of baseline odds } E_j{:}E_0 \text{ (log-odds ratio) conditional on } C_i$$

$$\Psi_{j,i} - \Psi_{j,0} = \text{generalized log-odds ratio conditional on } C_i \text{ (additive effects of } C_i)$$

$$\gamma'_i = (\Omega_{j,i}/\Omega_{j,0})^{(y_j - y_0)} = \text{standardized odds ratio (standardized multiplicative effects of } C_i)$$

$$\beta_i = \ln(\gamma'_i) = \frac{\Psi_{j,i} - \Psi_{j,0}}{y_j - y_0} = \text{standard log-odds ratio (standardized additive effects of } C_i)$$

$$p_{0,i} = \prod_{j=1}^{J} (p_{j,i})^{e_j} = \text{reference proportion for condition } C_i$$

$$p_{j,0} = \prod_{i=1}^{I} (p_{j,i})^{c_i} = \text{reference proportion for outcome event } E_j$$

$$p_{0,0} = \prod_{i=1}^{I} \prod_{j=1}^{J} (p_{j,i})^{c_i e_j} = \text{reference proportion for cell } (i,j)$$

$$\omega_{j,i} = (p_{j,i}/p_{0,i}) = \text{observed baseline odds } E_j{:}E_0 \text{ conditional on } C_i$$

$$\omega_{j,0} = (p_{j,0}/p_{0,0}) = \text{observed baseline odds } E_j{:}E_0 \text{ conitional on } C_0$$

$$\frac{\omega_{j,i}}{\omega_{j,0}} = \frac{(p_{j,i}/p_{0,i})}{(p_{j,0}/p_{0,0})} = \text{observed baseline odds ratio}$$

$$\psi_{j,i} = \ln(p_{j,i}/p_{0,i}) = \text{logarithm of observed baseline odds } E_j{:}E_0 \text{ conditional on } C_i$$

$$\psi_{j,i} - \psi_{j,0} = \text{observed baseline log-odds ratio}$$

$$p_{+j} = \sum_{i=1}^{I} f_{ij}/N = \text{observed proportion associated with outcome event } E_j$$

$$P_{+j} = \sum_{i=1}^{I} F_{ij}/N = \text{unconditional probability associated with outcome event } E_j$$

$$f_{i0} = \prod_{i=1}^{I} (f_{ij})^{c_i} = \text{observed reference frequency for condition } C_i$$

$$f_{00} = \prod_{i=1}^{I} \prod_{j=1}^{J} (f_{ij})^{c_i e_i} = \text{observed reference frequency for each cell } (i,j)$$

$$f_{0j} = \prod_{j=1}^{J} (f_{ij})^{e_j} = \text{observed reference frequency associated with outcome event } E_j$$

BLOCKS 11 and 14: Selection of an Initial Model and Outcome Scores

The additive form of the effects model for a categorical outcome and categorical conditions is:

$$\Psi_{j,i} - \Psi_{j,0} = \sum_{m=1}^{M} \beta_{im}(y_{jm} - y_{0m}) \tag{1}$$

$$i = 1, 2, \ldots, I$$
$$j = 1, 2, \ldots, J;$$

where $\Phi_{j,i} \equiv \Psi_{j,i} - \Psi_{j,0}$, $J = 1, 2, \ldots, J$, define the (additive) effects of condition $C_i$ on the outcome events $E_j$, $j=1,2,\ldots,J$, from the given reference perspective ($E_0$, $C_0$). For each condition $C_i$, the $\Psi_{j,i}$, $j=1,2,\ldots,J$ have a monotonic relationship with the corresponding conditional probabilities, $P_{j,i}$, $j=1,2,\ldots,J$. Hence, $\Psi_{j,i}$ is a measure of the likelihood of the outcomes $E_j$, $j=1,2,\ldots,J$ under condition $C_i$. Similarly, $\Psi_{j,0}$ is a measure of the likelihood of the outcomes $E_j$, $j=1,2,\ldots,J$ under some condition reference ($C_0$):

$$\Psi_{j,0} = \sum_{i=1}^{I} c_i \Psi_{j,i}, \text{ where } c_i \geq 0 \text{ and } \sum_{i=1}^{I} c_i = 1$$

The likelihood of outcome event $E_j$ is defined relative to some outcome reference, denoted $E_0$. Specifically, a preferred embodiment for the additive measure can be expressed as:

$$\Psi_{j,i} = G_{j,i} - G_{0,i}$$

where $$G_{0,i} = \sum_{j=1}^{J} P_j G_{j,i},$$

and $$G_{j,i} = \ln P_{j,i}.$$

Similarly, a preferred embodiment for the multiplicative measure can be expressed as:

$$\Omega_{j,i} = \exp(G_{j,i})/\exp(G_{0,i}),$$

where the $G_{j,i}$ and $G_{0,i}$ are as described above.

Since $\Psi_{j,i}$ is an additive measure of the conditional likelihood of $E_j$ given $C_i$, then $\Omega_{j,i}$ is a multiplicative measure of the conditional likelihood of $E_j$ given $C_i$. The ratio $\Omega_{j.0}/\Omega_{j.i} = \exp(\Psi_{j.i} - \Psi_{j.0})$ is also a measure of increased likelihood which will be referred to as the multiplicative effect of $C_i$ on $E_j$. The preferred embodiment of a multiplicative likelihood measure is the odds. For example, a multiplicative effect based on an odds ratio might be interpreted as follows:

"The odds of improvement vs. no change (i.e., the $E_2:E_0$ odds) is 4.46 times as high for patients exposed to the test drug ($C_1$) than for those given a placebo ($C_0$)."

Interpretations for more general outcome references where $e_j \neq P_j$, will be discussed later in the section describing options associated with the selection of the reference point ($E_0$, $C_0$); see also Blocks 12 and 13 of FIG. 1.

Choices for selecting an initial model refer to the following selection options:
1) Specification of the functional relationship between $\Psi_{j.i}$ and $P_{j.i}$ (e.g., $\Psi_{j.i} = \ln(P_{j.i}) - \ln(P_{0.i})$);
2) The number of components $M > 1$; $\ln(P_{0.i})$);
3) standardizing restrictions to identify the $y_{jm}$ scores and determine the relative distance between the associated outcome events $E_j$, $j = 1, 2, \ldots, J$ for the mth model component; and
4) restrictions on the $\beta_{im}$ parameters which serve to define these parameters as standardized effects associated with each condition $C_i$.

A preferred embodiment for the functional relationship in 1) is discussed in detail below. For simplicity but without loss of generality, we will now interpret the parameters in the single component model (i.e., $M = 1$) and postpone further discussion of multi-component models until later. For the 1-component model we will omit the subscript m:

$$\Psi_{j.i} - \Psi_{j.0} = \beta_i(y_j - y_0)$$

$$i = 1, 2, \ldots, I \; j = 1, 2, \ldots, J; \quad (1:M=1)$$

Graphically, eqs. (1:M=1) represent I straight lines, the effects lines, which intersect at point $(y_0, 0)$. The ith such line, which describes the effects of condition $C_i$, has slope $\beta_i$:

$$\beta_i = \frac{\Psi_{j.i} - \Psi_{j.0}}{y_j - y_0} \quad (2)$$

Hence, $\beta_i$ represents a standardized effect of condition $C_i$ on outcome event $E_j$ from the given reference point $(E_0, C_0)$. That is, $\beta_i$ represents the increase in the likelihood of a change of one unit on the outcome scale due to a change from $C_0$ to $C_i$. Unlike the unstandardized measure of effect, $\Psi_{j.i} - \Psi_{j.0}$, which assesses the effects of a change from the outcome reference $E_0$ to the specific outcome event $E_j$, $\beta_i$ does not depend on any particular outcome event. The user may define the "unit" of measurement, as described below (see "customizing the outcome scale"), and hence determine the precise meaning of the standardized effects. (For component m of an M-component model, $\beta_{im}$ denotes the standardized effect of condition $C_i$ relative to condition reference, $C_{0m}$.)

By deflation, the effect of the condition reference itself is zero (i.e., $\Psi_{j.0} - \Psi_{j.0} = 0$) and the standardized effect, denoted by $\beta_0$, is also taken to be zero. Graphically, the condition reference is represented in the effects plot by a horizontal line which intersects the effects lines at the point $(y_0, 0)$; hence, it represents the horizontal axis.

The invention uses the $y_j$ score associated with outcome event $E_j$ to position each event horizontally on the lower border of the plot of the effects lines (the "effects plot"), thus graphically displaying the relative spacing between the events. The $y_j$ establish the unit of measurement for the horizontal axis (the "outcome" dimension) of the effects plot.

The score $y_0$ is associated with the outcome reference $E_0$. It is defined in terms of the $y_j$:

$$y_0 = \sum_{j=1}^{J} e_j y_j, \text{ where } e_j \geq 0 \text{ and } \sum_{j=1}^{J} e_j = 1$$

The requirement that the $e_j$ be nonnegative and sum to one is a preferred embodiment which prevents the outcome reference from falling below the minimum y-score or becoming higher than the maximum y-score and hence limits the horizontal range of the effects plot to the actual range of the y-scores.

The effect associated with the outcome reference, denoted $\Psi_{0.i} - \Psi_{0.0}$, is always zero. We have:

$$\Psi_{0.i} = \sum_{j=1}^{J} e_j \Psi_{j.i}, \text{ and } \Psi_{0.0} = \sum_{j=1}^{J} e_j \Psi_{j.0},$$

Hence, $$\Psi_{0.i} - \Psi_{0.0} = \sum_{j=1}^{J} e_j(\Psi_{j.i} - \Psi_{j.0}) = \sum_{j=1}^{J} e_j \beta_i(y_j - y_0)$$

$$= \beta_i\left[\left(\sum_{j=1}^{J} e_j y_j\right) - \left(\sum_{j=1}^{J} e_j y_0\right)\right] =$$

$$\beta_i\left[(y_0) - \left(y_0 \sum_{j=1}^{J} e_j\right)\right]$$

$$= \beta_i[(y_0) - (y_0)] = 0$$

The specification of the functional relationships between $\Psi_{j.i}$ and $P_{j.i}$ for two preferred embodiments described below have the additional property that $\Psi_{0.i} = 0$ for $i = 1, 2, \ldots, I$.

Figure 3:
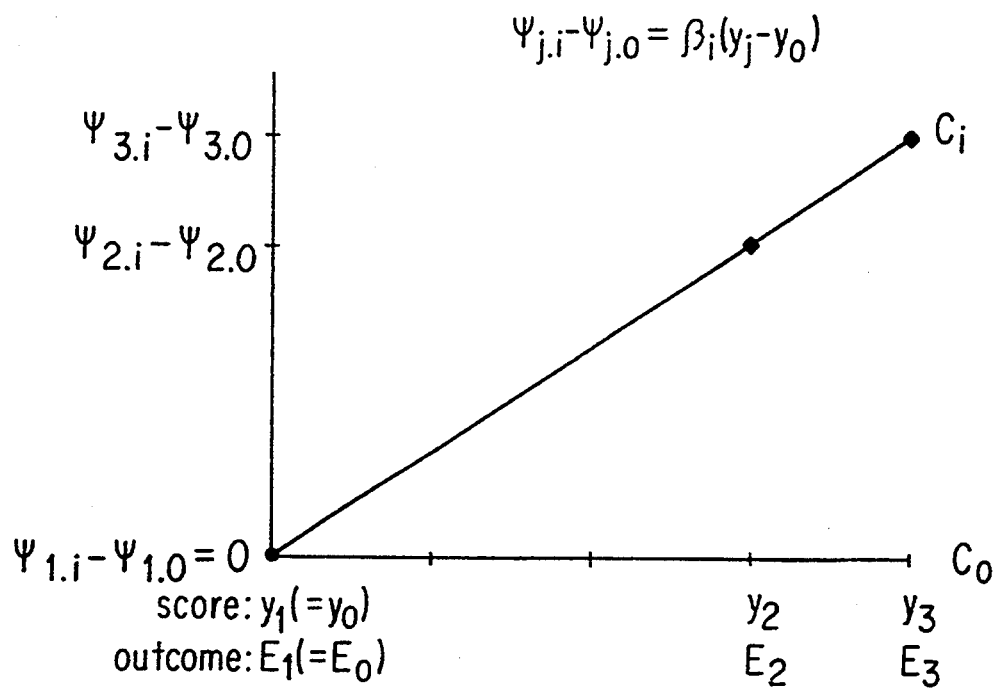
FIGS. 3-4: Effects Line Associated with some Condition $C_i$ where $E_0 = E_1$

FIG. 3 depicts the effects line for some condition $C_i$ associated with the three outcome events $E_1$, $E_2$, and $E_3$, where the first such event serves as the outcome reference (i.e., $E_0 = E_1$). The horizontal axis represents the condition reference $C_0$.

The relative distance, d, between any two outcome events, say $E_2$ and $E_3$, is defined with respect to the outcome reference $E_0$:

$$d(2,3) = (y_2 - y_0)/(y_3 - y_0)$$

For the situation described in FIG. 3, the relative distance between outcomes $E_2$ and $E_3$ is $\frac{3}{4}$. That is, from the outcome reference $E_0$, $E_2$ is $\frac{3}{4}$ of the way towards $E_3$ along the horizontal axis.

The effects are measured along the vertical axis. The effects on $E_2$ and $E_3$ are found by substituting $j = 2$ and $j = 3$ respectively into model (1:M=1):

$$\Psi_{2.i} - \Psi_{2.0} = \beta_i(y_2 - y_0) \quad (3.1)$$

and $$\Psi_{3.i} - \Psi_{3.0} = \beta_i(y_3 - y_0) \quad (3.2)$$

It is clear that the ratio of these two effects also equals $\frac{3}{4}$. More generally, a 1-component model implies that the relative distance between any two outcome events is directly proportional to the effects on these outcomes and does not depend upon any specific condition. For example, dividing eq. (3.1) by (3.2) yields:

$$d(2,3) \equiv \frac{y_2 - y_0}{y_3 - y_0} = \frac{\Psi_{2.i} - \Psi_{2.0}}{\Psi_{3.i} - \Psi_{2.0}} \quad i = 1, 2, \ldots, I$$

Customizing the Outcome Scale

In order to set the location and scale for the outcome scores, two standardizing restrictions need to be placed on the $y_j$. The scale restriction may be selected from one of the following preferred embodiments:

A) The $y_j$ are standardized to have a standard deviation of 1.

B) $y_{j'} - y_0$ is set to 1 for some particular outcome event $E_{j'}$.

A preferred embodiment for the location restriction is:

C) The $y_j$ are standardized to have a mean of 0.

Alternative embodiments for the two restrictions are:

D) The value for $y_0$ is set to 0 and the maximum of the $y_j$-scores is set to 1, E) The minimum of the $y_j$-scores is set to 0 and the maximum of the $y_j$-scores is set to 1, or F) Values for any two $y_j$-scores are set to given values.

Once the $y_j$-scores are fixed, they may be replaced by any set of new scores that satisfy the following formula:

$$y'_j = (y_j - a)/b$$

$$j = 1, 2, \ldots, J \quad (4)$$

for any constant a and any nonzero constant b (see e.g., Goodman (1984), which is hereby incorporated herein by reference, at page 205). In this case, selection of the two constants a and b serve as replacements for two standardizing conditions used to identify the original $y_j$-scores.

Changing from the $y_j$-scores to the $y'_j$-scores does not affect the unstandardized effects $\Psi_{j.i} - \Psi_{j.0}$, but they alter the scale for the standardized effect parameters, which change from $\beta_i$ to $\beta'_i = b\beta_i$. From eqs. (2) and (4) we have $$\beta'_i = \quad (5)$$

$$\frac{\Psi_{j.i} - \Psi_{j.0}}{y'_j - y'_0} = \frac{\Psi_{j.i} - \Psi_{j.0}}{[(y_j - a)/b - (y_0 - a)/b]} = b \frac{\Psi_{j.i} - \Psi_{j.0}}{y_j - y_0}$$

Figure 4:
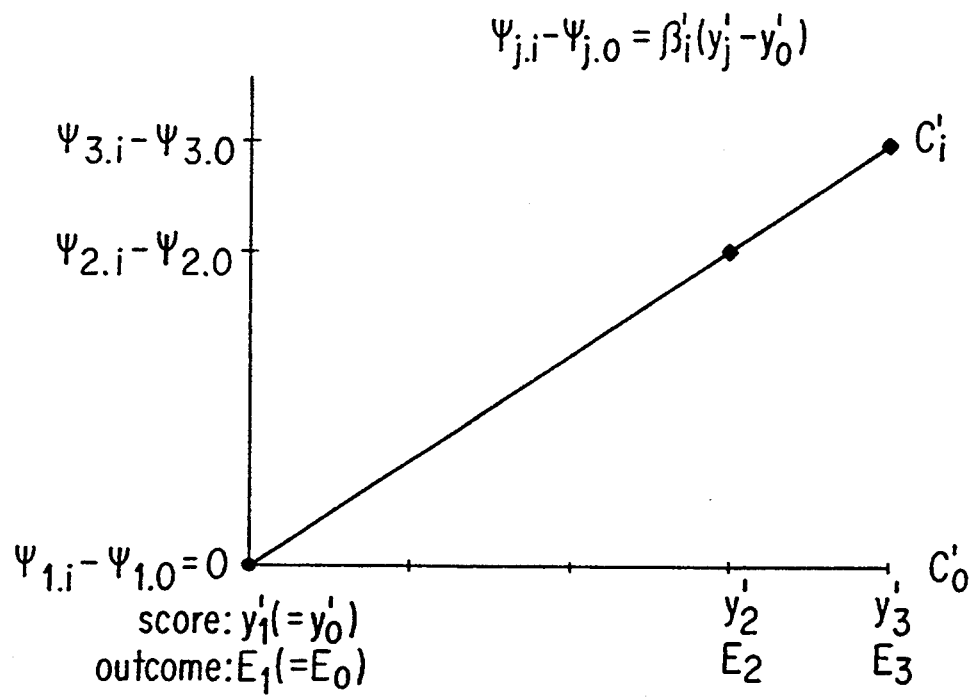

FIG. 4 depicts the same effects plot as in FIG. 3 except that the $y'_j$—scores.

By changing the outcome scale, the definition of the outcome "unit" changes and hence the interpretation of the standardized effects change. For example, under the D-restrictions given above, $\beta_i$ represents the likelihood of the outcome changing from the outcome reference $E_0$ to the outcome assigned the highest score due to a change from some condition reference $C_0$ to condition $C_i$.

The condition reference, $C_0 = (c_1, c_2, \ldots, c_I)$, is represented by the horizontal axis in FIGS. 3 and 4. The requirement that the $c_i$ be nonnegative and sum to one is a preferred embodiment which limits the vertical range of the effects plot to the actual range of the effects.

A Preferred Model Embodiment

As a preferred embodiment, $\Psi_{j.i}$ is defined relative to the outcome reference $E_0$. Preferred model embodiments are selected from among M-component models (M > 1) where the effects take on the following structural form:

$$\Psi_{j.i} = G_{j.i} - G_{0.i} \quad (6.1)$$

$$\Psi_{j.0} = G_{j.0} - G_{0.0} \quad (6.2)$$

$$G_{0.i} = \sum_{k=1}^{J} e_k G_{k.i}, \; G_{j.0} = \sum_{i=1}^{I} c_i G_{j.i}, \quad (6.3)$$

$$G_{0.0} = \sum_{i=1}^{I} c_i \sum_{j=1}^{J} e_j G_{j.i} = \sum_{i=1}^{I} c_i G_{0.i} = \sum_{k=1}^{J} e_k G_{k.0},$$

and $G_{j.i}$ is a monotonic function of $P_{j.i}$.

The first effect term, $\Psi_{j.i} = (G_{j.i} - G_{0.i})$, represents the difference in the likelihood of occurrence between outcome $E_j$ and the outcome reference $E_0$, that is expected under the condition reference $C_i$. It follows for example, that if $\Psi_{1.i} > \Psi_{2.i}$, then under condition $C_i$, outcome event $E_1$ is more likely to occur than outcome event $E_2$.

The second term, $\Psi_{j.0} = (G_{j.0} - G_{0.0})$, represents the similar difference that would be expected under the condition reference, $C_0$. The difference between the first and second terms, $\Phi_{j.i} \equiv \Psi_{j.0} - \Psi_{j.0}$, define the effects of condition $C_i$ on the outcomes $E_j$, $j = 1, 2, \ldots, J$, from the perspective of the reference point $(E_0, C_0)$.

INTERPRETATION OF EFFECTS FROM ASSOCIATION MODELS

Note that for association models, $\Psi_{j.i}$ is the logarithm of the baseline odds $E_j:E_0$ conditional on $C_i$:

$$\Psi_{j.i} = \ln P_{j.i} - \ln P_{0.i}$$

$$= \ln(P_{j.i}/P_{0.i}) = \ln(P_{ij}/P_{i0})$$

where $$P_{0.i} = \prod_{j=1}^{J} (P_{j.i})^{e_j} \text{ and } P_{io} = \prod_{j=1}^{J} (P_{ij})^{e_j} \text{ and } P_{ij}$$

is the probability associated with cell (i,j).

The effects under association models can be expressed as the logarithm of the odds ratio, the odds ratio itself being a readily interpretable quantity:

$$\Psi_{j.i} - \Psi_{j.0} = \ln \frac{(P_{j.i}/P_{0.i})}{(P_{j.0}/P_{0.0})}, \quad (9)$$

where "ln" denotes the natural logarithm, $$P_{j.0} = \prod_{i=1}^{I} (P_{j.i})^{c_i}, \text{ and } P_{0.0} = \prod_{i=1}^{I} \prod_{j=1}^{J} (P_{j.i})^{c_i e_j},$$

Taking the antilog of both sides of model (1) transforms the model from an additive effects form in terms of the log-odds-ratios $\Phi_{j.i} = (\Psi_{j.i} - \Psi_{j.0})$ to the preferred embodiment in terms of multiplicative effects, the odds ratios $\Theta_{j,i}=(\Omega_{j,i}/\Omega_{j,0})$:

$$\Omega_{j,i}/\Omega_{j,0} = \prod_{m=1}^{M} \gamma_{min}^{(y_{jm}-y_{0m})} \quad (10)$$

$$i = 1, 2, \ldots, I$$
$$j = 1, 2, \ldots, J;$$

where $$\Omega_{j,i} \equiv \exp(\Psi_{j,i})$$

and $$\gamma_{im} \equiv \exp(\beta_{im})$$

$$\Theta_{j,i} = \Omega_{j,i}/\Omega_{j,0} = \frac{(P_{j,i}/P_{0,i})}{(P_{j,0}/P_{0,0})} = \frac{(F_{ij}/F_{i0})}{(F_{0j}/F_{00})},$$

where $F_{i0} = \prod_{j=1}^{J} (F_{ij})^{e_j}$, $F_{0j} = \prod_{i=1}^{I} (F_{ij})^{c_i}$, and $F_{00} = \prod_{i=1}^{I} \prod_{j=1}^{J} (F_{ij})^{c_i e_j}$ Since odds ratios are readily interpretable, effects plots based on association models as a preferred embodiment display (as the default option) the effect quantities in odds ratio units, $\Omega_{j,i}/\Omega_{j,0}$, although they will always be used to display the effects in logarithmic units $(\Psi_{i,j}-\Psi_{j,0})$ in a semilog plot on a logarithmic scale to preserve the linearity of the effect plots.

The effects can be calculated as a function of estimated conditional probabilities, or as a function of the estimated expected frequency counts, both of which are results from estimation algorithms depending upon whether all of the conditions are categorical or whether one or more are continuous.

The distance between outcome $E_j$ and the outcome reference $E_0$, changes from $y_j-y_0$ to $j_j-y'_0$, where $$y_0 = \sum_{j=1}^{J} e_j y_j \text{ and } y'_0 = \sum_{j=1}^{J} e'_j y_j$$

Extensions to the multidimensional contingency table

The above discussion pertains to a 1-component association model. In the general case there are M-components. Let $\Phi_{j,i}(m) \equiv \Psi_{j,i}(m)-\Psi_{j,0}(m)$ denote the expected effects of condition $C_i$ on the outcome event $E_j$ associated with the mth component of some model where the condition reference is $C_{0m}=(c_{1m}, c_{2m}, \ldots, c_{Im})$, and the outcome reference is $E_{0m}=(e_{1m}, e_{2m}, \ldots, e_{Jm})$:

$$\Psi_{j,i}(m)-\Psi_{j,0}(m)=\beta_{im}(y_{jm}-Y_{0m})$$

$$i=1,2,\ldots, I \; j=1,2,\ldots,J;$$

BLOCKS 12 and 13: Selection of the Reference Point

Selection of an initial effects model involves selection of the type of model as well as the standardizing restriction on the y-scores. Several different association models are described in Goodman, 1991. For the simple 2×2 table given earlier to illustrate the input data, there are only two possible (although trivial) association models—$M_0$ and $M_1$. Model $M_0$ is the model of statistical independence which posits no effect, i.e., no statistical relationship between the conditions (rows) and the outcomes (columns). Model $M_1$ specifies that there is some effect.

For concreteness, assume that the user selects model $M_1$, and sets the two y-scores to equal 0 and 1 respectively for the $E_1$="no change" and $E_2$="improve" outcomes, respectively. In this simple situation for $I=2$ conditions and $J=2$ outcomes, model $M_1$ provides a perfect fit to the data, and hence the model parameters can be illustrated with simple calculations from the observed data. See the section entitled "General Estimation Algorithms" for details on the general algorithm.

Blocks 12 and 13 pertain to the reference perspectives from which the effects are defined. The effects of each condition $C_i$ is defined relative to a baseline called the "condition reference", $C_0$, selected in Block 13.

For example, to define the effect of the test drug ($C_1$) relative to the placebo ($C_2$), the placebo condition would be selected as the baseline by specifying $C_0=(0,1)$. Alternatively, $C_0=(1,0)$ defines the effects relative to the treatment condition, and $C_0=(0.5, 0.5)$ defines the effects of each condition relative to the "average" condition.

Similarly, to define the effect on improvement ($E_2$) relative to the no change outcome ($E_1$), the no change outcome would be selected as the outcome reference by specifying $E_0=(1,0)$. Alternatively, $E_0=(0,1)$ defines the improvement outcome as the outcome reference.

If an "average" reference is selected, normally it is defined using either equal weights for each category; e.g., $C_0=(0.5, 0.5)$, or weights proportional to the marginal (row or column) distribution. However, any non-negative weights may be used, so long as they sum to 1. Below, the use of the outcome reference $E_0=(0.75, 0.25)$ is illustrated. As mentioned earlier, these particular selections serve as the reference point which is used to identify and define the effects which are calculated in Blocks 15 and 16.

BLOCK 15: Estimation of Likelihood of Outcome $E_j$ given Condition $C_i$

The calculation of the estimated conditional likelihood for each outcome $E_j$, $j=1,2,\ldots,J$ under the association model where $\Omega_{j,i}=F_{ij}/F_{i0}$, is illustrated below for several alternate choices for the outcome reference, $E_0$. For example, if the outcome reference is selected to be the "no change" outcome category, the odds for improvement (relative to the "no change" outcome) for each condition $C_i$, is calculated as follows:

| i | CONDITION | OUTCOME (j = 1) No Change | (j-2) Improvement | ODDS IN FAVOR IMPROVEMENT $F_{i2}/F_{i0}$ |
|---|---|---|---|---|
| 1 | test drug | 13 | 28 | 28/13 = 2.154 |
| 2 | placebo | 29 | 14 | 14/29 = 0.483 |

Hence, the odds of improving (relative to the baseline category "no change") is 2.154 for patients who received the test drug, and 0.493 for patients who received the placebo. (Note that the odds of no change, relative to the no change baseline, by definition is 1; i.e., $F_{11}/F_{10}=13/13=1$, $F_{21}/F_{20}=29/29=1$).

Alternatively, if $E_0=(0.5, 0.5)$, the odds are calculated relative to the (unweighted) "average" outcome category, average here being defined based on the unweighted geometric mean of the frequency counts in the outcome categories:

Average count for condition $i=1$:
$F_{10}=(13*28)^{0.5}=(13^{0.5}*28^{0.5})=19.08$
Average count for condition $i=2$:
$F_{20}=(29*14)^{0.5}=(28^{0.5}*14^{0.5})=20.15$
in which case, the following odds are attained:

| | | OUTCOME | | ODDS IN FAVOR OF: | |
|---|---|---|---|---|---|
| i | CONDITION | (j = 1) No Change | (j = 2) Improvement | No Change $F_{i1}/F_{i0}$ | Improvement $F_{i2}/F_{i0}$ |
| 1 | test drug | 13 | 28 | 13/19.08 = 0.681 | 28/19.08 = 1.468 |
| 2 | placebo | 29 | 14 | 29/20.15 = 1.439 | 14/20.15 = 0.695 |

Hence, the odds of improving (relative to the "average" outcome) is 1.468 for patients who received the test drug, and 0.695 for patients who received the placebo. Alternatively, expressed in terms of $F_{i1}/F_{i0}$ rather than $F_{i2}/F_{i0}$, the odds of no change (relative to the average outcome) is 0.681 for patients who received the test drug, and 1.439 for patients who received the placebo.

Next, we will illustrate the use of a "weighted" outcome reference $E_0=(0.75, 0.25)$ which assigns a weight three times as high to the no change outcome as to the improvement outcome:

Weighted average for condition $i=1$:
$F_{10}=13^{0.75}*28^{0.25}=15.75$
Weighted average for condition $i=2$:
$F_{20}=29^{0.75}*14^{0.25}=24.17$
which yields the following odds:

| | | OUTCOME | | ODDS IN FAVOR OF | |
|---|---|---|---|---|---|
| i | CONDITION | (j = 1) No Change | (j = 2) Improvement | No Change $F_{i1}/F_{i0}$ | Improvement $F_{i2}/F_{i0}$ |
| 1 | test drug | 13 | 28 | 13/15.75 = 0.825 | 28/15.75 = 1.778 |
| 2 | placebo | 29 | 14 | 29/24.17 = 1.200 | 14/24.17 = 0.579 |

Blocks 16 and 18: Calculate and Plot Expected Effects

For association models, the effects relative to the condition reference $C_0$ are given by the ratio of the odds $\Theta_{j,i}=\Omega_{j,i}/\Omega_{j,0}$, or the additive counterpart, the log-odds ratio $\Phi_{j,i}=\Psi_{j,i}-\Psi_{j,0}$. The odds ratio represents the increase in the baseline odds associated with a change from the condition reference $C_0$ to condition $C_i$. As a preferred embodiment, the effects line is plotted using a semilog plot where the effects are plotted in logarithmic units on the vertical axis. Each cell (i,j) in the matrix of frequency counts contributes a point $(y_j, \Phi_{j,i})$ to the plot. For the 1-component model the effects plot consists of I intersecting straight lines (the "effects lines"), one corresponding to each of the I conditions. The effects line for condition $C_i$ contains the effects of condition $C_i$ on each outcome; each of the outcomes are identified by a marker on the lower border of the plot, the effect, $\Phi_{j,i}$, is obtained from the vertical axis.

The effects $\Psi_{j,i}-\Psi_{j,0}$, are plotted directly above markers for each of the J outcomes that are positioned horizontally along the lower border of the plot. The outcome markers are spaced according to the associated outcome scores, $y_j = 1,2, \ldots, J$. The ith effects line has slope equal to $\beta_i$. All effects lines intersect at the point $(y_0, 0)$.

Optionally, each cell in the observed $I \times J$ matrix contributes an "observed" point to the effects plot. To the extent to which the observed point is close to the corresponding effects line, the model provides a good fit to the data. Both the expected and observed points are interpretable in terms of odds ratios.

The plot itself consists of the five parts described below plus two optional parts described later in this section. The plots are illustrated first using association model $M_1$ applied to the $2 \times 2$ sample input data. Several additional data sets are used later to illustrate more general plots.

1-COMPONENT EFFECTS PLOTS

1) The lower border (outcome markers). The lower border of the plot contains markers for each of the J outcomes (i.e., for each column of the matrix). The relative distance between these markers is determined by the statistical model. The distance between markers j and j' is given by $y_j - y_{j'}$. To the extent to which two (or more) markers coincide, the effects on the associated outcomes cannot be distinguished from each other (under the model) and the corresponding columns in the frequency matrix can be merged without any expected loss of information. 2) The expected effects (odds ratios) lines. Unique maximum likelihood estimates under the user-selected statistical model are obtained for each expected odds ratio $\Theta_{j,i}=(P_{j,i}/P_{0,i})/(P_{j,0}/P_{0,0})$, where $P_{j,i}/P_{0,i}$ is the expected odds for outcome $E_j$ (relative to $E_0$) conditional on $C_i$ and $P_{j,0}/P_{0,0}$ is the corresponding expected odds conditional on reference $C_0$. For each row $i=1,2, \ldots, I$ of the table, the expected odds ratios $\Theta_{1,i}, \Theta_{2,i}, \ldots, \Theta_{J,i}$ are plotted (on a logarithmic scale) directly above the respective markers for $E_1, E_2, \ldots, E_J$, and the adjacent points (i.e., points directly above the adjacent markers) are connected by a line. This plot results in a line for row i called the "effects line for condition $C_i$". (For many 1-component models, the effects lines will be straight lines.)

3) The side border (vertical scale). Located on the left or right hand side of the plot, the side border measures the units of odds ratios on a logarithmic scale. Thus, for example, the vertical distance between odds ratios of 0.5 and 1.0 is equal to the vertical distance between odds ratios of 1.0 and 2.0. (This means that doubling the odds ratio has the same interpretation regardless of whether the base odds ratio is 0.5 or 1.0.) Note that an odds ratio of 1.0, which corresponds to a log-odds ratio of 0, represents the null effect (i.e., no change from some base odds ratio). Optionally, logarithmic grid lines may appear in the plot (as horizontal lines) to assist the user with interpolations.

4) The horizontal axis (condition reference). For the condition reference, the corresponding expected odds ratio, $\Theta_{j,0}=(P_{j,0}/P_{0,0})/(P_{j,0}/P_{0,0})=1$ (i.e., equals the null effect), for each j. Hence, the "expected odds ratio line" for the condition reference is a horizontal "null effects line" which represents the horizontal axis of the effects plot. (If a particular condition, say $C_i$, is selected as the condition reference, the effects line for that condition will coincide with the horizontal axis.)

Since the null effects line has slope 0, the slope of the effects line for any condition $C_i$ represents the standardized effect of that condition (relative to the condition reference). That is, it represents the increase in the likelihood of a change of one unit on the outcome scale due to a change from $C_0$ to $C_i$. The further the slope from zero, the larger the magnitude of the effect for that condition. To the extent to which two (or more) lines have the same slope, the effects pertaining to the associated conditions are not significantly different from each other (under the model) and the corresponding rows in the table may be merged without any expected loss of information.

For clarity, the horizontal axis will be designated in the figures by a dashed line.

5) The vertical axis (outcome reference). This axis represents the outcome reference used to define the odds for any outcome. If a particular outcome, say $E_j$, is selected as the outcome reference, the marker for outcome $E_j$ (on the lower border of the plot) will lie directly on the vertical axis.

For clarity, the vertical axis will be designated in the figures by a dotted line.

Note that all of the effects lines intersect at the reference point.

Figure 5:
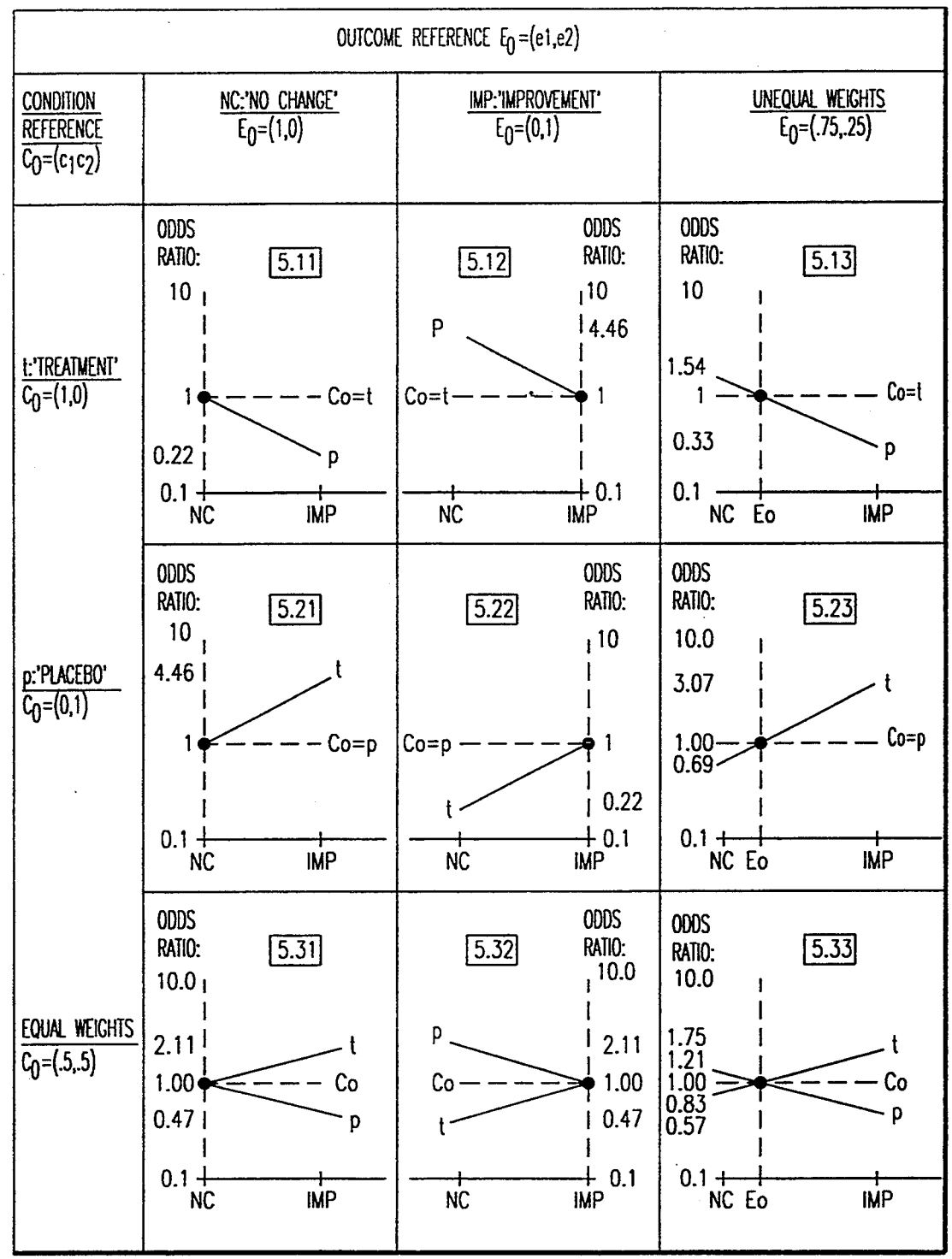
FIG. 5: Nine Alternative Perspectives for Displaying the Effect in a 2×2 Table

FIG. 5 illustrates the simple effects plot for the 2×2 sample input data from the perspective of nine different reference points ($E_0$, $C_0$). Each reference point is defined by the selection of one of the three outcome references which comprise the columns in FIG. 5 and one of the three condition references which comprise the rows of FIG. 5. The resulting nine plots have been assigned an identifying label "5.rc" corresponding to row r and column c of FIG. 5.

Plot 5.21 is based on the reference point $E_0=(1,0)$, $C_0=(0,1)$, corresponding to patients who received the placebo and experienced no change. The effect illustrated in this plot is interpreted as follows: "The odds of improvement (vs. no change) are 4.46 times as high for patients who received the test drug than those who received the placebo."

Plot 5.31 is based on the same outcome reference as plot 5.21, $E_0=(1,0)$, but the condition reference is the "unweighted average" reference $C_0=(0.5,0.5)$, corresponding to an "average" patient who has an equal chance of receiving the test drug or the placebo. The effects illustrated in this plot are interpreted as follows: "The odds of improvement (vs. no change) are 2.11 times as high for patients who received the test drug than for the average patient. The odds of improvement (vs. no change) are 0.47 times as high for patients who received the placebo than for the average patient."

Each of these plots convey the same information but from a different perspective. For example, by taking the ratio of the test drug effect to the placebo effect from plot 5.31 (as displayed on the vertical axis of plot 5.31), these effects are transformed into the test vs. placebo effect displayed in plot 5.21 (i.e., 2.1122/0.4734=4.46).

Plot 5.23 is based on the same condition reference as plot 5.21, $C_0=(0,1)$, but the outcome reference is $E_0=(0.75,0.25)$, corresponding to a baseline rate of improvement where three patients show no change for every one that shows improvement. The effects illustrated in this plot is "The odds of improvement (vs. the baseline rate of improvement) are 3.07 times as high for patients who received the test drug than those who received the placebo. The odds of no change (vs. the baseline rate of improvement) are 0.69 times as high for patients who received the test drug than those who received the placebo."

Note that by taking the ratio of the effect on improvement to the effect on no change as displayed in plot 5.23, we again obtain the improvement vs. no change effect of 4.46 displayed in plot 5.21 (i.e., 3.070/0.688=4.46).

The two optional parts of the effects plot are:

6) Determine predicted outcome scores associated with a given condition $C_i$ and add to the display. A vertical arrow associated with each condition, points downwards onto the lower border at a particular point that corresponds to the "expected outcome score for that condition". The preferred embodiment utilizes the "model-based" method of calculating the prediction, as documented herein. A second preferred embodiment uses the conventional conditional probability approach based on the expected frequencies that are estimated by the model. Under the second preferred embodiment these alternate predicted outcome scores coincide with the average outcome score computed using the associated observed frequency counts.

The prediction compliments the information provided by the expected odds ratios about the effect of that condition on the outcome. The expected odds ratios describe the relative effect of $C_i$ on each outcome $E_j$ (relative to the outcome and condition reference). The prediction, on the other hand, provides an absolute measure of effect for condition $C_i$ onto the outcome space. To the extent to which two (or more) effects lines have the same slope, the corresponding predictions will coincide.

7) (Optional) Calculate and overlay observed odds ratios (and/or odds ratios expected under other models) as a means of assessing the model. The observed odds ratios associated with condition $C_i$, $\theta_{1.i}, \theta_{2.i}, \ldots, \theta_{J.i}$, or standardizations of these odds ratios, may be superimposed onto the display, plotting them as points directly above the respective marker for $E_1, E_2, \ldots, E_J$. The extent to which these points are close to the expected effects line for condition $C_i$ describes how well the model fits the observed data for that condition. The pattern of the observed points in relation to the associated effects line may serve a diagnostic function to suggest how the model may be modified if it does not fit the data. The observed odds ratios associated with one, some, or all conditions may be added to the display.

Expected odds ratios associated with the condition $C_i$ that are attainable under some other model(s) may be added to the display instead of or in addition to the observed odds ratios. Such odds ratios may provide a more precise diagnostic function than the observed odds ratios allowing the user to pinpoint the part(s) of the model that are mostly responsible for the lack of fit to the data.

Figure 6:
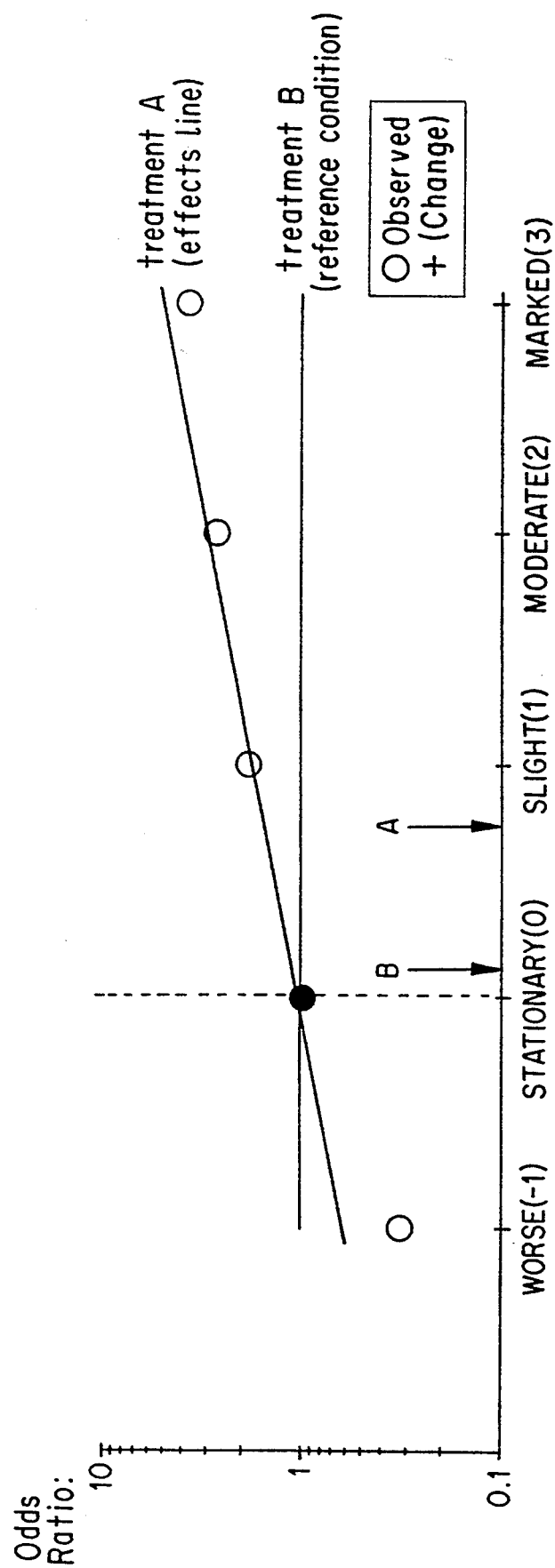
FIG. 6: Effects Plot for DeJonge Data ($E_0$=Stationary, $C_0$=Treatment B)
Figure 7:
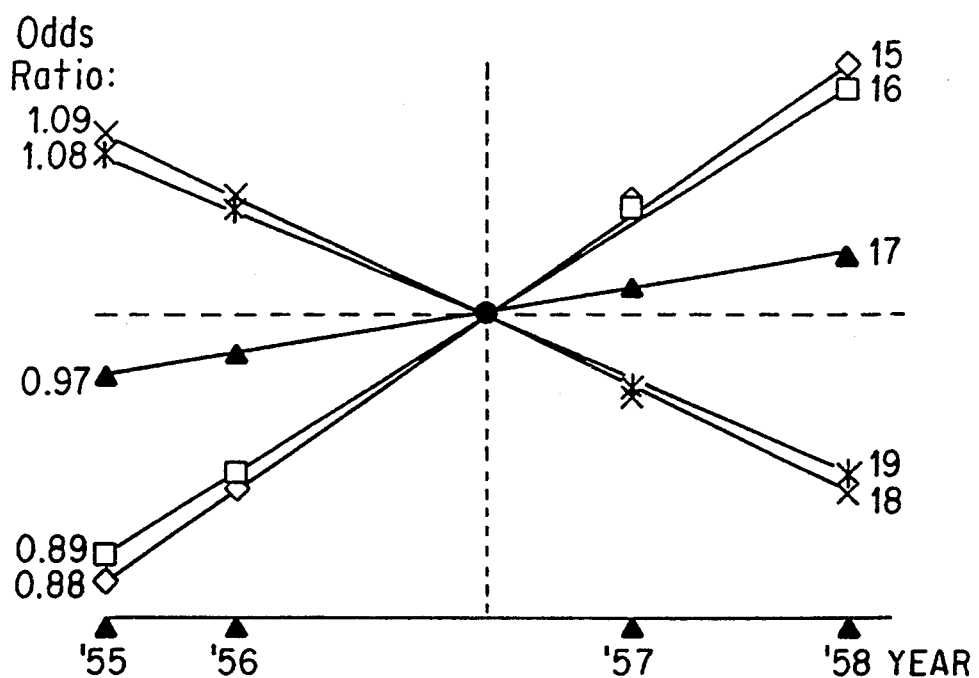
FIG. 7-8: The Y-View Effects Plots for Rasch (1966) Data (Outcome=Year) with Weighted Average Reference Point
Figure 8:
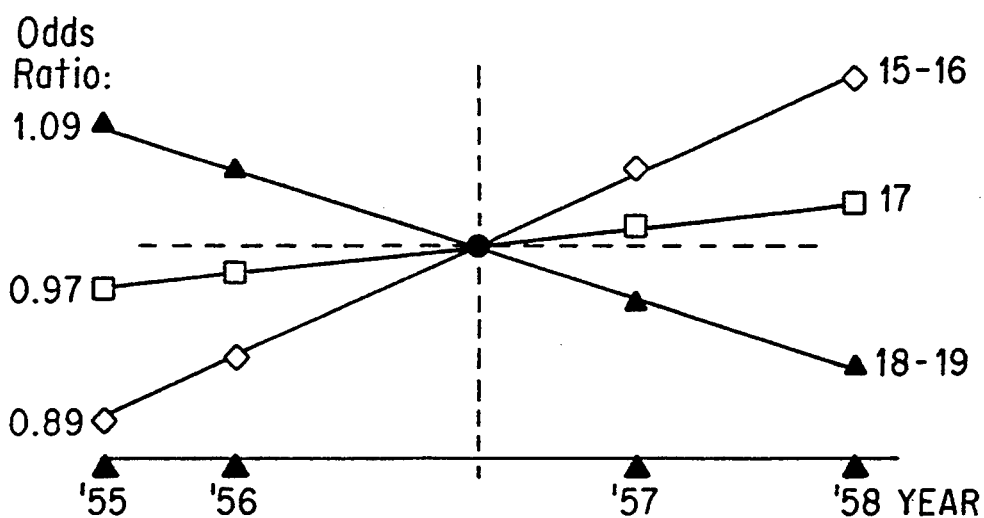
Figure 9:
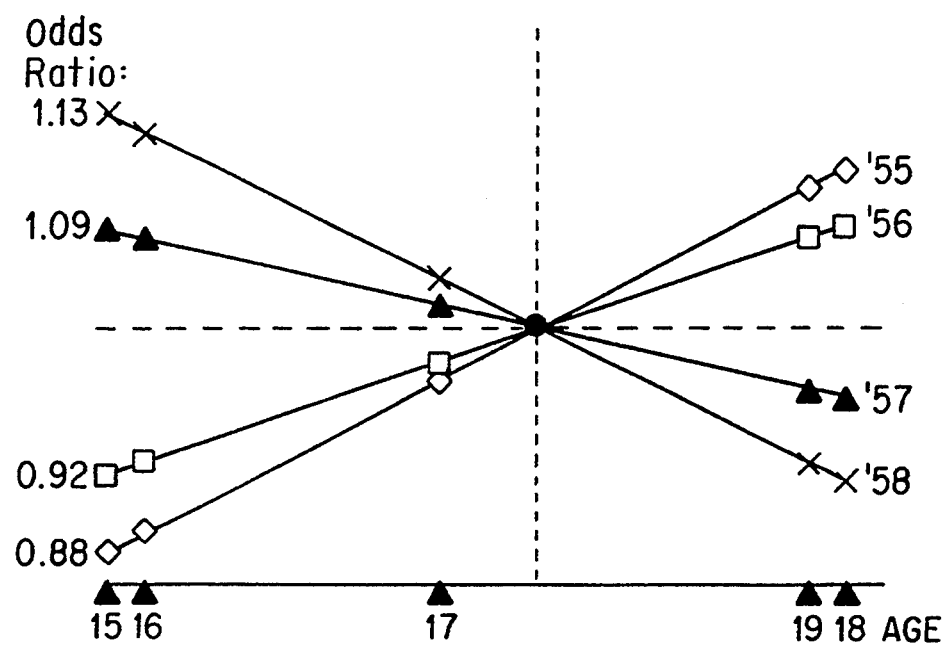
FIG. 9-10: The X-View Effects Plots for Rasch (1966) Data (Outcome=Year) with Weighted Average Reference Point
Figure 10:
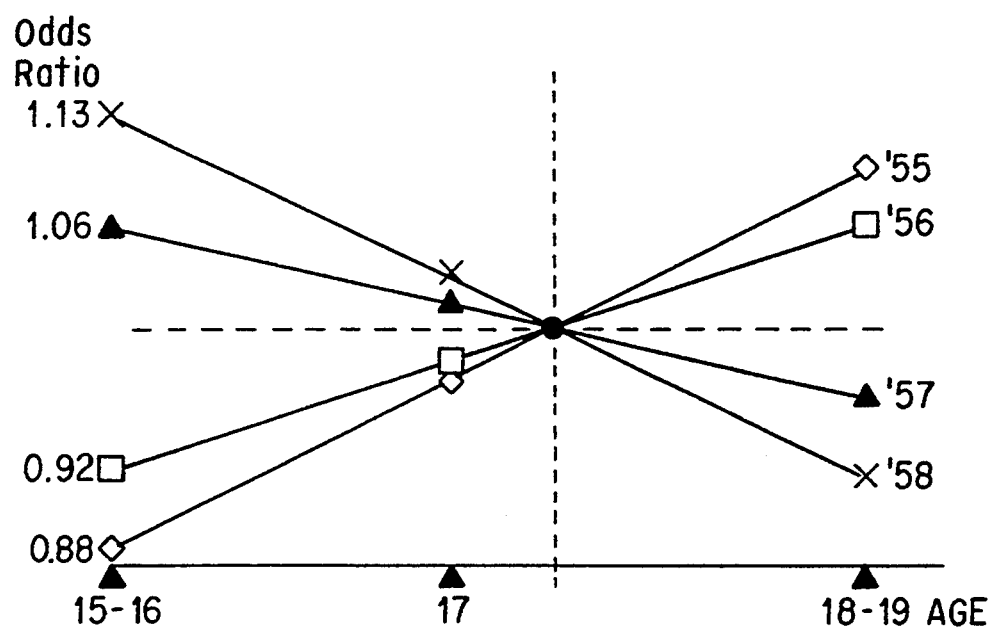
Figure 11:
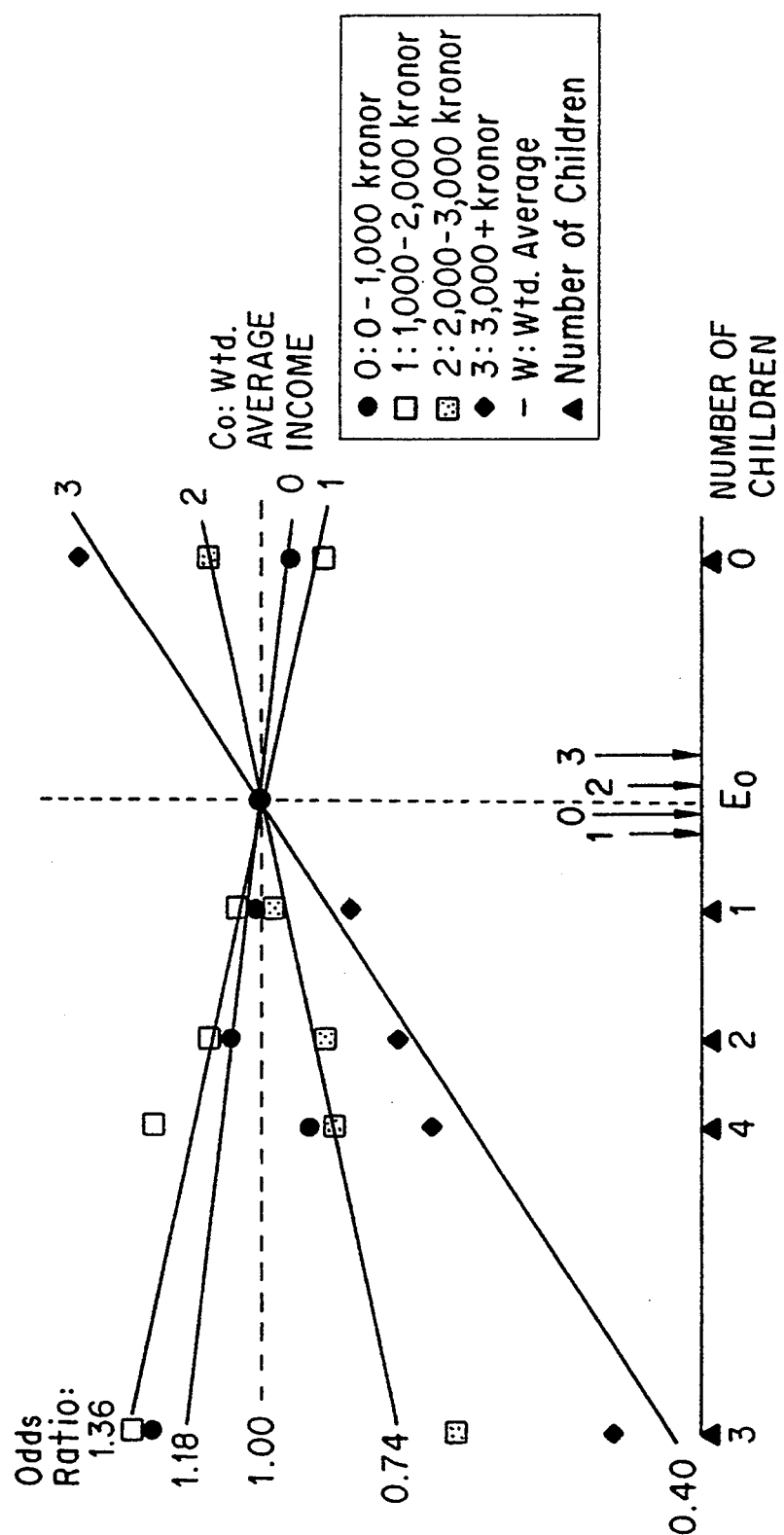
FIG. 11: Effects Plot for Cramer (1945) Crossclassification of 25,263 Swedish Families Data with Weighted Average Reference Point

FIG. 6 provides an effects plot that corresponds to the data in the following frequency matrix:

TABLE 3A

Observed Counts, Baseline Odds, Odds Ratios and Logits
baseline response category = "Stationary"

|  | Worse (−1) | Sta- tionary (0) | Improvement Slight (1) | Moderate (2) | Marked (3) | Mean Score |
|---|---|---|---|---|---|---|
| Treatment | 1 | 13 | 16 | 15 | 7 | 1.27 |
| Placebo | 5 | 21 | 14 | 9 | 3 | 0.69 |
| Odds: |  |  |  |  |  |  |
| -Treatment | 0.08 | 1.00 | 1.23 | 1.15 | 0.53 |  |
| Placebo | 0.24 | 1.00 | 0.67 | 0.43 | 0.14 |  |
| Odds Ratio | 0.32 | 1.00 | 1.85 | 2.69 | 3.77 |  |
| Log-odds Ratio | −1.13 | 0 | 0.61 | 0.99 | 1.33 |  |

TABLE 3B

ML Estimates for Expected Counts, Baseline Odds, Odds
Ratios and Log-odds Ratios and Projections under the R-model

|  | Worse (−1) | Sta- tionary (0) | Improvement Slight (1) | Moderate (2) | Marked (3) | Pro- jected Score |
|---|---|---|---|---|---|---|
| Treatment | 1.58 | 12.78 | 15.10 | 15.12 | 7.41 | 1.27 |
| Placebo | 4.42 | 21.22 | 14.90 | 8.88 | 2.59 | 0.69 |
| Expected Odds: |  |  |  |  |  |  |
| Treatment | 0.12 | 1.00 | 1.18 | 1.18 | 0.58 |  |
| Placebo | 0.21 | 1.00 | 0.70 | 0.42 | 0.12 |  |
| Expected Odds Ratio | 0.59 | 1.00 | 1.68 | 2.83 | 4.75 |  |
| Expected Log-odds Ratio | −0.52 | 0 | 0.52 | 1.04 | 1.56 |  |

Example:

Input Data: Cross-Classification of 025,263 Swedish Families According to Number of Children Per Family (Outcome) and Yearly Income (Predictor)

| Income (kronor) | Number of Children |  |  |  |  |
|---|---|---|---|---|---|
|  | 0 | 1 | 2 | 3 | 4+ |
| (0) 0–1,000 | 2,161 | 2,755 | 936 | 225 | 39 |
| (1) 1,000–2000 | 3,577 | 5,081 | 1,753 | 419 | 98 |
| (2) 2,000–3,000 | 2,184 | 2,222 | 640 | 96 | 31 |
| (3) 3,000+ | 1,636 | 1,052 | 306 | 38 | 14 |

Initial model (Mo) selected for illustration is Goodman's RC-model which estimates a scale for determining the relative distances between the income categories and also estimates a scale for the outcome categories.

Choice for condition reference ($C_o$): Actual selection used for illustration is weighted average (of scaled income categories).

Choice for outcome reference ($E_o$): Actual selection used for illustration is weighted average (of scaled outcome categories).

This display shows that the tendency is for higher income individuals (relative to those with lower income) to have fewer children. At the bottom of the chart we see that except for persons with 3 and 4 or more children (designated by '3' and '4' respectively on the chart), the number of children scale goes from higher to lower on the chart. The relative distances were scaled by the RC model. The arrows at the bottom of the chart show the income projections onto the number of children dimension. Except for persons with 0 and 1 child, the higher the income, the fewer the number of children.

The vertical dotted line represents the outcome reference $E_o$, which in this case is the weighted average for the number of children scale. We see that persons in the lower income categories designated '0' and '1' are projected to be to the left of the outcome reference which means that as a group, they tend to have more children than average. Those in the higher income categories designated '2' and '3' are projected to the right of the reference outcome which means that they tend to have fewer children than the average household.

The lines provide the relative effect estimates under the RC model in terms of odds ratios. The symbols show the corresponding observed odds ratios. The extent to which the model fits the data is assessed by the distance between the symbols and the corresponding line. If the RC model provided a perfect fit to the data, all symbols would fall perfectly on the appropriate lines. For example, the line representing the highest income category (labeled '3' on the right side of the chart), shows that they are only 0.4 times as likely to have 3 children than the average household. The associated diamond symbol is slightly above the line here. On the other hand, the lowest income group are predicted to be 1.18 times as likely than average to have 3 children.

The slope of the line represents the effect of income level i on having fewer children (relative to the average income category).

Multivariate 1-Component Plots and Partial Effects Plots

Thus far in our discussion of 1-component models, examples consisted of a single categorical outcome variable and a single categorical or continuous conditioning variable. However, the 1-component models themselves and the associated plots are not so limited. They are more generally applicable to any number of outcome variables and any number of categorical and/or continuous conditioning variables.

In this section we provide an example of a bivariate conditioning variable comprised of two factors—YEAR (1959 or 1971) of the survey and RACE (Black or White) of the respondents. For simplicity, we will now use the subscript i to for the categories of YEAR (i=1,2), j for RACE (j=1,2) and k for the OUTCOME variable (k=1,2,3). The joint conditioning variable $C_{ij}$=(YEAR, RACE) consists of I×J=2×2=4 conditions, which comprise the rows of the following table:

Response to "[Are] the radio and TV networks doing a good job, just a fair job, or a poor job?" Source: Duncan and McRae (1979)

| i | j | Condition $C_{ij}$ YEAR | RACE | RESPONSE Good | Fair | Poor | Total |
|---|---|---|---|---|---|---|---|
| 1 | 1 | 1959 | Black | 81 | 23 | 4 | 108 |
| 1 | 2 | 1959 | White | 325 | 253 | 54 | 632 |
| 2 | 1 | 1971 | Black | 224 | 144 | 24 | 392 |
| 2 | 2 | 1971 | White | 600 | 636 | 158 | 1,394 |
|  |  |  |  |  |  |  | 2,526 |

The 1-component multi-condition effects model can be expressed as:

$$\Phi_{k.ij} = \Psi_{k.ij} - \Psi_{k.00}$$

$$=\beta^{YR}_{ij}(y_k-y_0)$$

$$i=1,2; j=1,2; k=1,2,3; \tag{21}$$

where $$\Psi_{k.ij}=\ln(P_{k.ij}/P_{0.ij})$$

$P_{k.ij}=$ probability associated with $E_k$, conditional on $C_{ij}$ and $$P_{0.ij} = \prod_{k=1}^{K}(P_{k.ij})^{e_k} = \text{reference probability for condition } C_{ij}$$

Reference Point Selection

For this illustration the outcome reference category will be $k=1$ ("good"), i.e., $E_0=(1,0,0)$. the condition reference $C^{YR}_0(i,j)$ for the joint conditioning variable YEAR×RACE is taken to be $(i,j)=(1,1)$: 1959 Blacks ("B59"). Note that the condition reference may be expressed in terms of the individual conditioning variables, $C^Y_0(i)$ and $C^R_0(J)$ as given in the table below, indicating that the first category of RACE (Blacks) and the first category of YEAR (1959) is selected as the joint condition reference. In general, the joint condition reference is formalized as the product of each individual factor:

| | | | RACE | |
|---|---|---|---|---|
| | | | Black (j = 1) | White (j = 2) |
| i | YEAR | $C^Y_0(i)$ | $C^R_0(j)$: 1 | 0 |
| 1 | 1959 | 1 | 1 | 0 |
| 2 | 1971 | 0 | 0 | 0 |

Condition Reference $C^{YR}_0(i,j)$ for Joint Conditioning Variable and for each Individual Conditioning Variable

Model Selection

For the purpose of illustration of the general approach of decomposing a joint effect into the sum of separate individual effects, we select the main-effects-only association model; i.e., the model that contains separate main effects for YEAR ($\beta^Y_i$) and RACE ($\beta^R_j$) but no RACE×YEAR interaction effect:

$$\beta^{YR}_{ij}=\beta^Y_i+\beta^R_j$$

($\beta^Y_i$ is the "partial" effect associated with YEAR; $\beta^R_j$ is the "partial" effect associated with RACE.) where the usual ANOVA-like restrictions are used to identify the main effect parameters:

$$\beta^Y_2=-\beta^Y_1$$

and $$\beta^R_2=-\beta^R_1$$

Such decomposition is documented thoroughly in Goodman (1978) for log-linear models, by Haberman (1988) for association models and is the standard for the linear regression model when the outcome is continuous.

Figure 13:
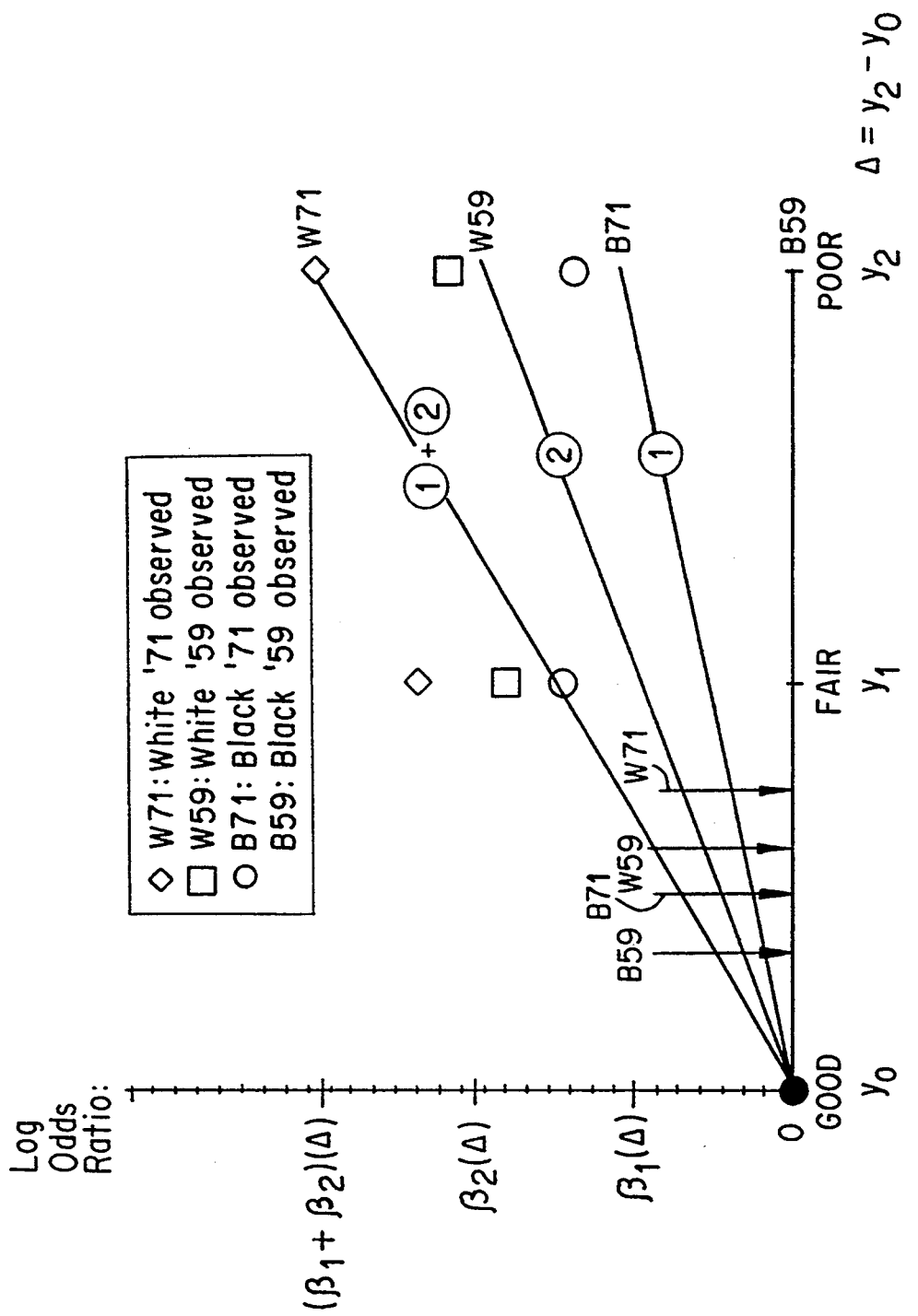
FIG. 13: Effects Plot for Duncan & McRae (1979) Data

The effects plot for this model is displayed in FIG. 13, based on a model that fixes the y-scores such that the "fair" outcome category is spaced equidistant from the "poor" and "good" outcome categories (e.g., $y_1=0$, $y_2=1$, $y_3=2$). As usual, the horizontal line represents the condition reference (denoted "B59"). Note that the distance ① and ② are equal. Slope ① represents the effect of 1971 (relative to 1959) for Whites, and slope ② represents the same effect for Blacks. Each of these slopes is a measure of the effect of YEAR, which is identical for Whites and Blacks because the model contains no RACE×YEAR interaction (i.e., the effect of YEAR does not depend upon RACE).

Since slopes ① and ② are equal, it follows that slope ① plus slope ③ equals slope ② plus slope ③. Slope ① plus slope ③ represents the effect of Whites (relative to Blacks) in 1959 and slope ② plus slope ③ refers to the same effect in 1971. Each of these slopes is a measure of the effect of RACE, which is identical across the two years because there is no RACE×YEAR interaction (i.e., the effect of RACE does not depend upon YEAR.).

This effects plot for the main-effects-only model is a substantial improvement over the plot presented by Duncan and McRae (1979) for the same model (model 5 displayed in FIG. 1 of Duncan and McRae, 1979).

Since the main-effects-only model contains separable effects for YEAR, and PACE, these effects can be presented in separate plots by re-expressing eq. (2) as follows. For YEAR, the effects may be expressed as:

$$\Psi_{k.ij}-\Psi_{k.0j}=\beta_i(y_k-y_0)$$

$$i=1,2; j=1,2; k=1,2,3;$$

and for the RACE effect we have:

$$\Psi_{k.ij}-\Psi_{k.i0}=\beta_j(y_k-y_0)$$

$$i=1,2; j=1,2; k=1,2,3;$$

where $$\Psi_{k.0j}=\ln(P_{k.0j}/P_{0.0j})$$

$$\Psi_{k.i0}=\ln(P_{k.i0}/P_{0.i0})$$

$P_{k.0j}=$ probability associated with $E_k$, conditional on $C_{0j}$ and $$P_{k.0j} = \prod_{i=1}^{I}(P_{0.ij})^{e_i} = \text{reference probability associated with } C_{0j}$$

and $$P_{k.i0} = \prod_{j=1}^{J}(P_{k.ij})^{e_j} = \text{reference probability associated with } C_{i0}$$

and $$P_{0.0j} = \prod_{k=1}^{K}(P_{k.0j})^{e_k} = \text{reference probability for condition } C_{ij}$$

Figure 14:
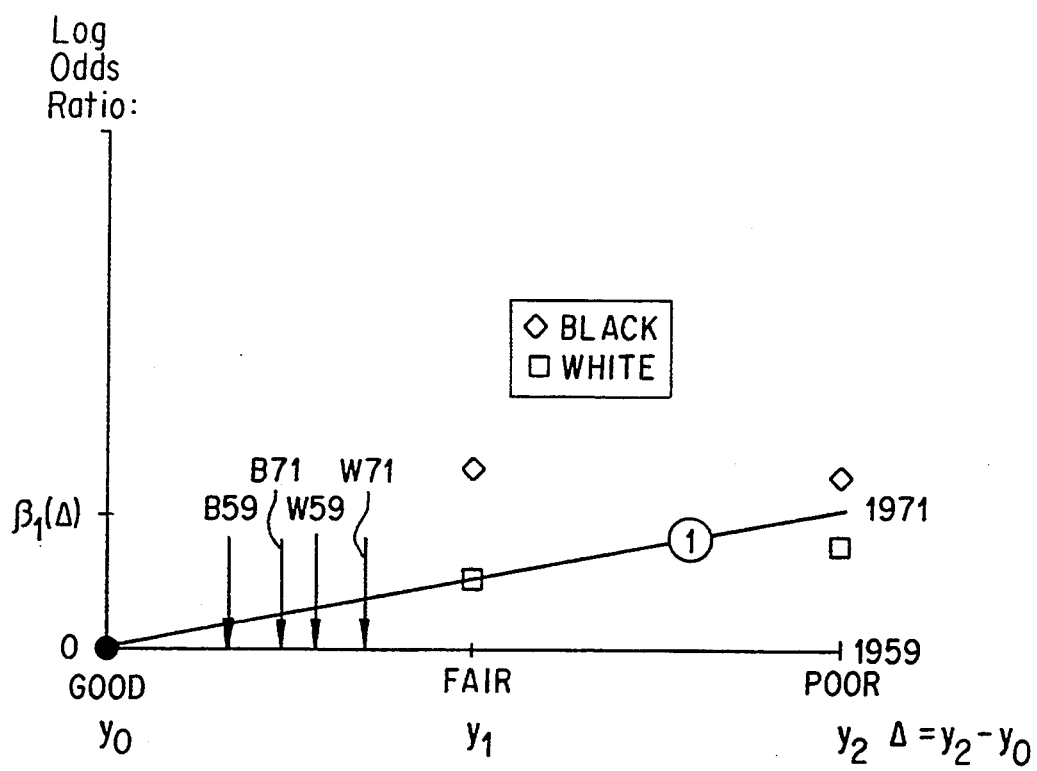
FIG. 14-15: Partial Effects Plots for Duncan & McRae (1979) Data
Figure 15:
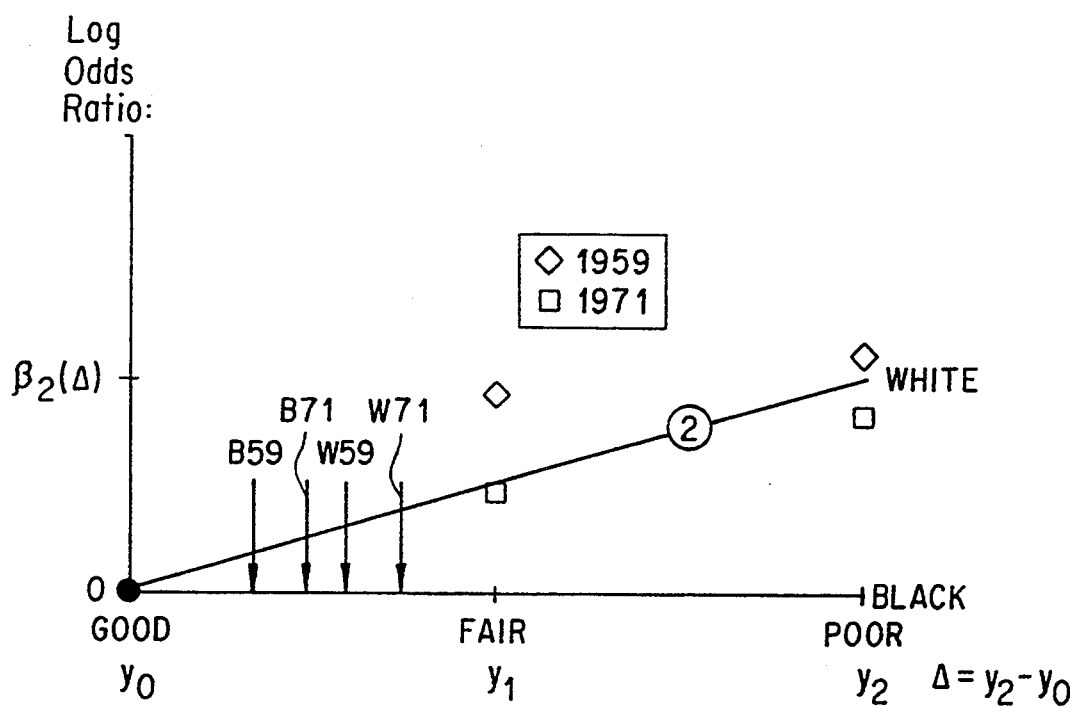

FIGS. 14 and 15 show the corresponding plots. For example, FIG. 14 shows that during the 1971 survey, respondents were about 1.85 times as likely to provide a rating of "poor" (relative to "good") than in the 1959 survey. FIG. 15 shows that Whites were 2.96 times as likely to provide a rating of "poor" (relative to "good") than Blacks.

Figure 24:
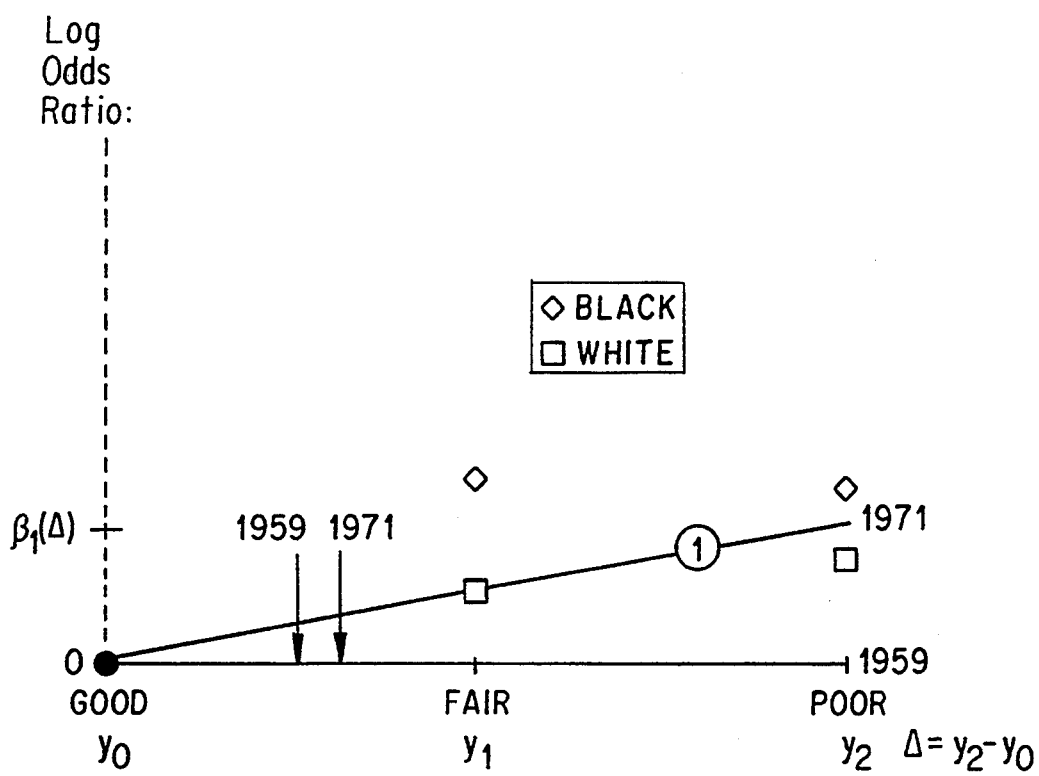
FIG. 24-25: Partial Effects Plot for Duncan & McRae (1979) Data with Partial Projections
Figure 25:
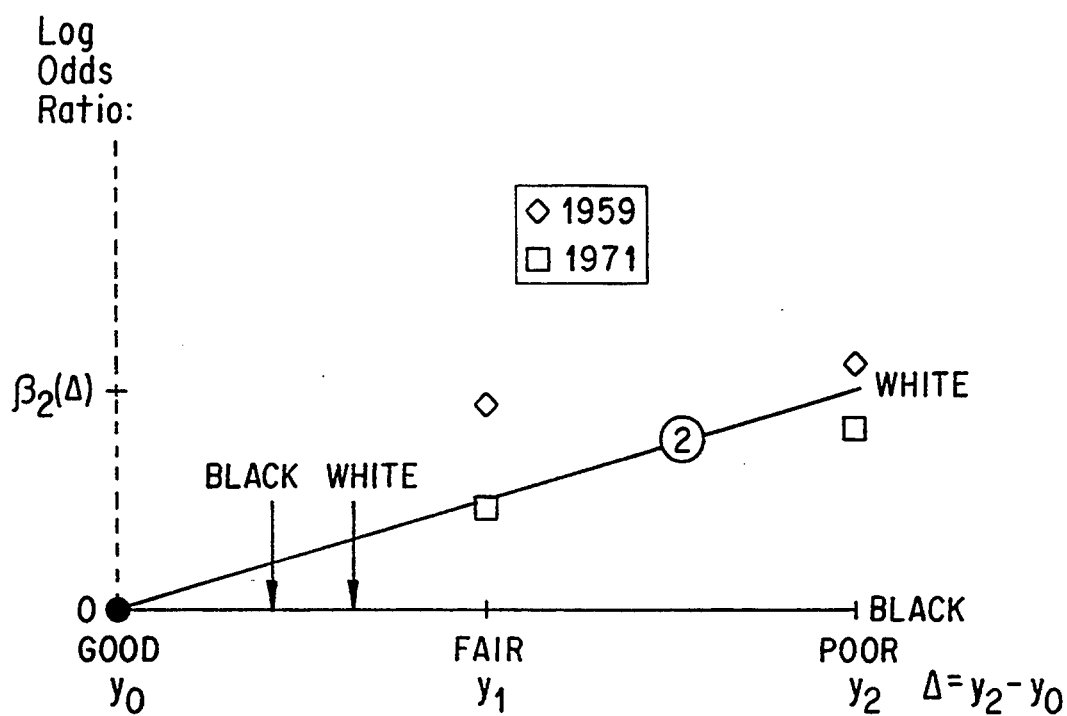

Notice that in FIGS. 14 and 15 that even though we now only display one of the two effects we can still display all four projection arrows. Alternatively, we can display just those two "partial" projection arrows associated with the two partial effects lines. FIGS. 24 and 25 show the same plots as in FIGS. 14 and 15 except that the "partial projection" arrows are displayed instead of the standard projections.

Computation of the projections and partial projections is straight-forward, once the expected counts have been estimated. Using the conventional probability based expectation formula, we simply compute the average outcome score for a given condition. For example, for Blacks in 1959, we simply use the expected counts in the row of the table corresponding to 1959 Blacks, to compute the conditional probability of obtaining each outcome category (good, fair and poor) and use these probabilities to determine the average (i.e., "projected") y-score (as in Table 3B earlier when there was a univariate conditioning variable):

$$y_{k.ij} = \sum_{k=1}^{3} P_{k.ij} y_k$$

To obtain the partial projections such as those associated with YEAR we need only compute the average outcome score based on the conditional probabilities, collapsing over RACE:

$$y_{k.i} = \sum_{k=1}^{3} P_{k.i} y_k; \text{ where } P_{k.i} = \sum_{j=1}^{2} P_{ijk} / \sum_{j=1}^{2} \sum_{k=1}^{3} P_{ijk}$$

Below are the expected counts, odds and odds ratios for the model that includes a race by year interaction effect in addition to the separate main effects for race and year. In this case, there are three partial effects plots, one for each main effect and one for the interaction effect. Summing the slopes in the three effects associated with a particular race and year together will provide the slope used for the effects line for that joint condition (e.g., 1971 Blacks) that is plotted in the main effects plot. Since an interaction term is included, the effect of race is now dependent on the particular year. Similarly, the effect of year depends upon the race. For the use and interpretations of interactions, see e.g., Goodman (1978) which is hereby incorporated herein by reference.

|  | good | fair | poor |
|---|---|---|---|
| $F_{ijk}$: | $F_{ij1}$ | $F_{ij2}$ | $F_{ij3}$ |
| b59 | 79.2267 | 26.5462 | 2.2272 |
| w59 | 322.5929 | 257.8142 | 51.5928 |
| b71 | 223.5317 | 144.9368 | 23.5314 |
| w71 | 604.65 | 626.70 | 162.65 |
| $\Omega_{k.ij}$: | $\Omega_{1.ij}$ | $\Omega_{2.ij}$ | $\Omega_{3.ij}$ |
| b59 | 1 | 0.335 | 0.028 |
| w59 | 1 | 0.799 | 0.1599 |
| b71 | 1 | 0.648 | 0.105 |
| w71 | 1 | 1.036 | 0.269 |
| $\Theta_{k.ij}$: | $\Theta_{1.ij}$ | $\Theta_{2.ij}$ | $\Theta_{3.ij}$ |
| b59 | 1 | 1 | 1 |
| w59 | 1 | 2.385 | 5.689 |
| b71 | 1 | 1.935 | 3.744 |

-continued

|  | good | fair | poor |
|---|---|---|---|
| w71 | 1 | 3.093 | 9.569 |

M-Component Plots

Whenever we have two or more y-score components, we no longer have a single linear plot. Either we have separate linear plots for each component, or we have a single linear plot when we consider only 2 outcome events (in which case an effects line is formed by connecting 2 points in the plot). In the case that an M-component model is displayed in a single plot, there is not necessarily a unique ordering of the outcome events on the horizontal border of the plot. For our final illustration, we shall plot the effects for the 2-component model given by Goodman(1991) for data on age by cancer type for cancer patients. Since each of the components provide a different ordering for the cancer outcome events, as a preferred embodiment, the 2-component effects plot displays the outcome in any order, equally spaced.

Figure 16:
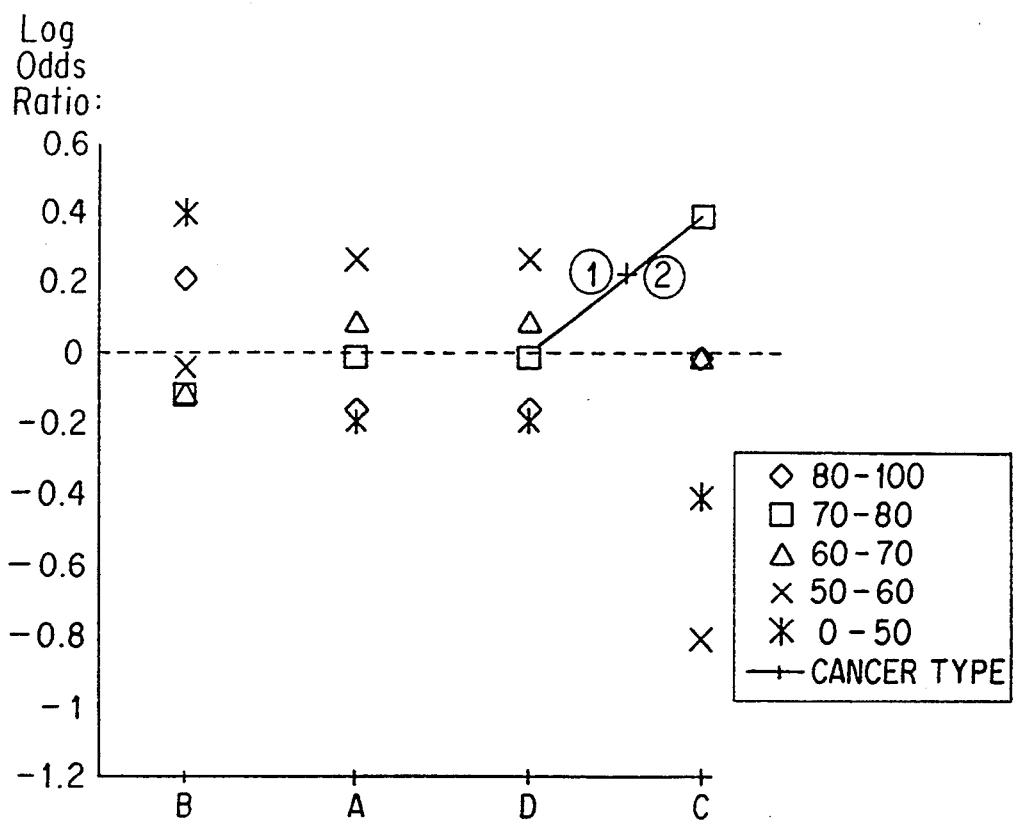
FIG. 16-22: Various Effects Plots for 2-Component Model

FIG. 16 displays the 2-component effects plot where cancer types A, B, C, and D are displayed in Goodman's original order, equally spaced, where the condition reference is the weighted average, but no outcome reference has been used. This plot is useful as a general profile. It shows for example that cancer patients most likely to get type B are those aged 0–50, while patients most likely to get type C are 70–80. It also shows that types A and D do not differ regarding age.

Figure 17:
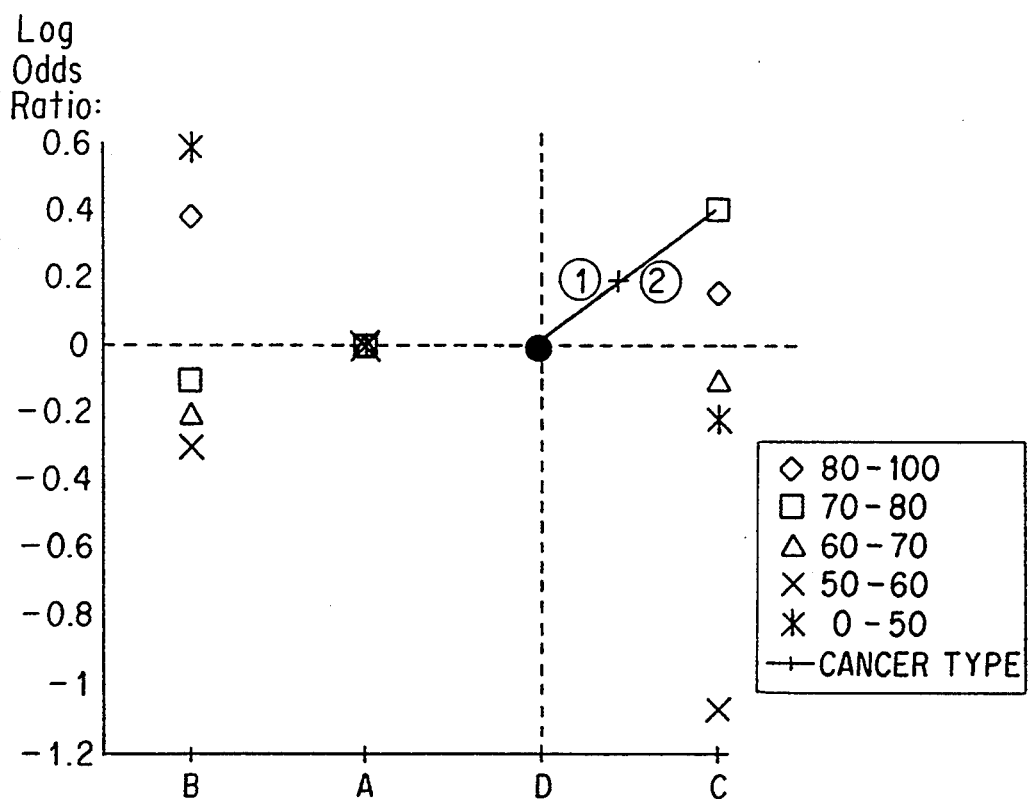

FIG. 17 shows the same plot, where outcome D has been selected as the outcome reference. Hence, profiles for B, A and C type patients are expressed relative to D. In both of these plots, we no longer have straight line effects because there is no single ordering of cancer types that is possible. There are two separate sets of outcome scores; one for each of the two outcome components.

Figure 18:
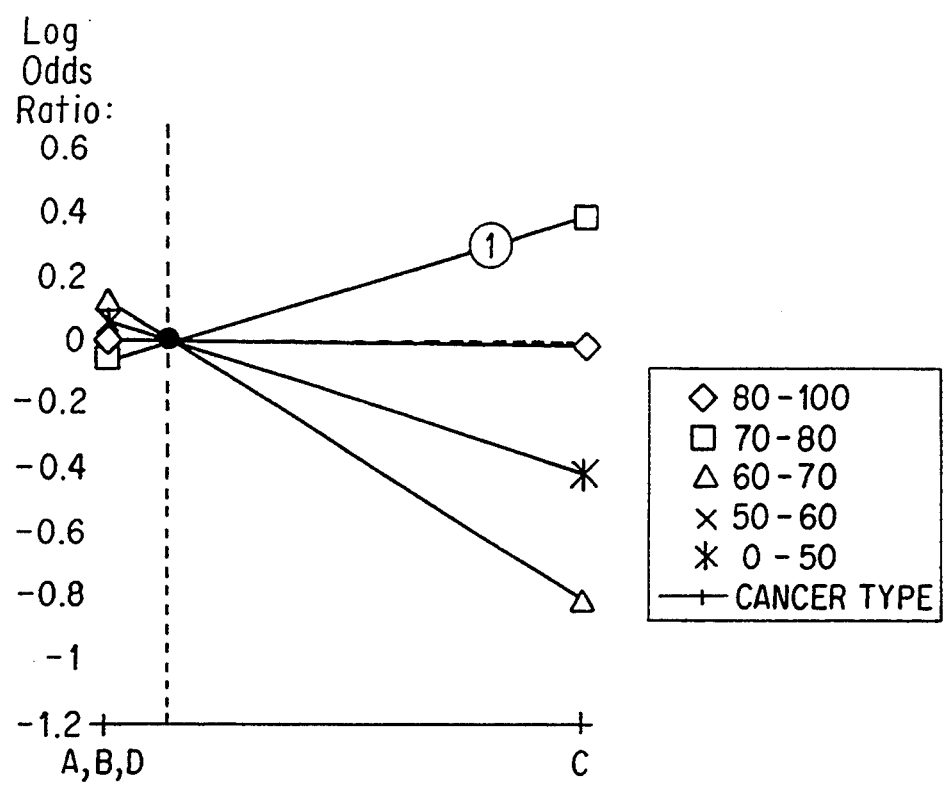
Figure 19:
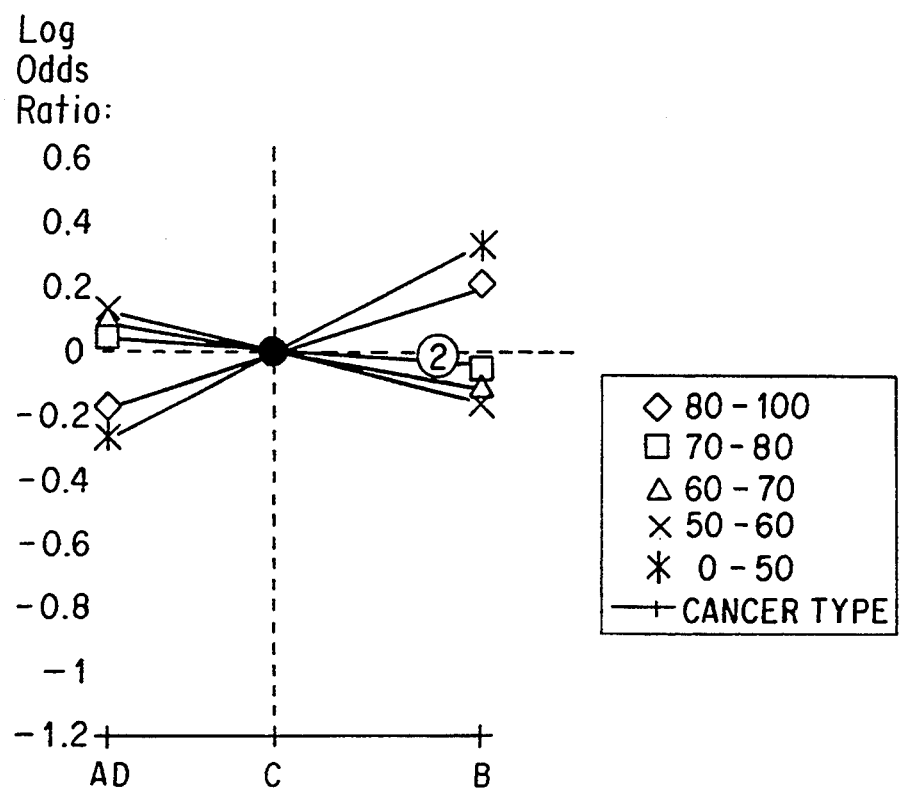

The line labeled "1+2" is used to identify the slope associated with two points on the effect plot. This slope equals the sum of the corresponding 1-component effects plots. FIGS. 18 and 19 show the 1-component effects plots associated with the 2-component plot in FIG. 16. The weighted average outcome reference is used in each of these 1-component plots.

Figure 20:
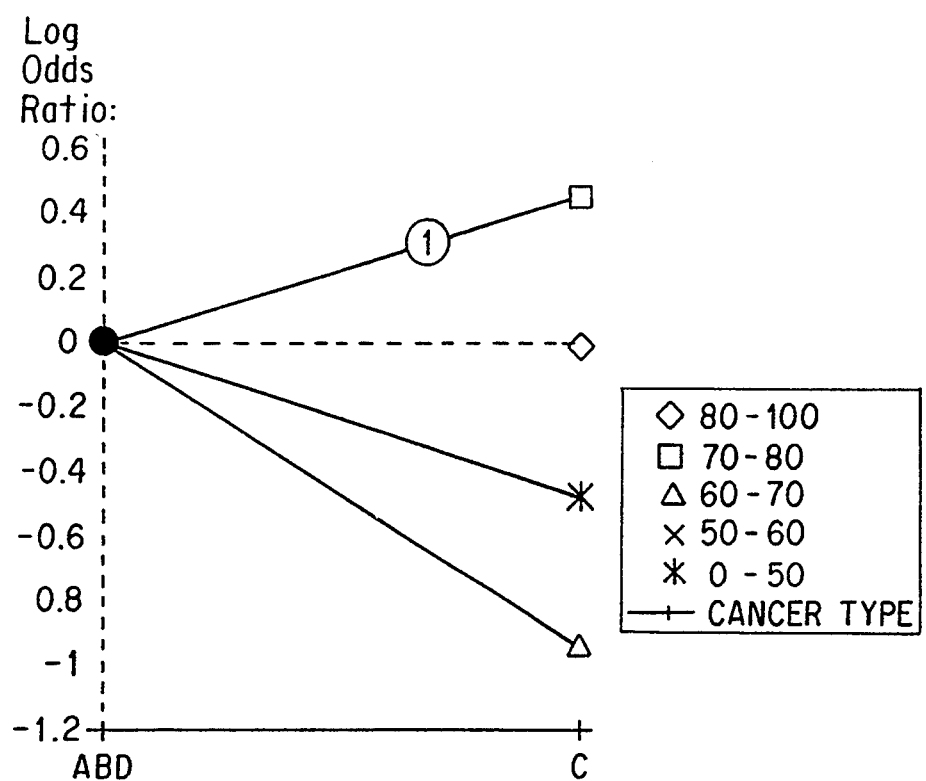
Figure 21:
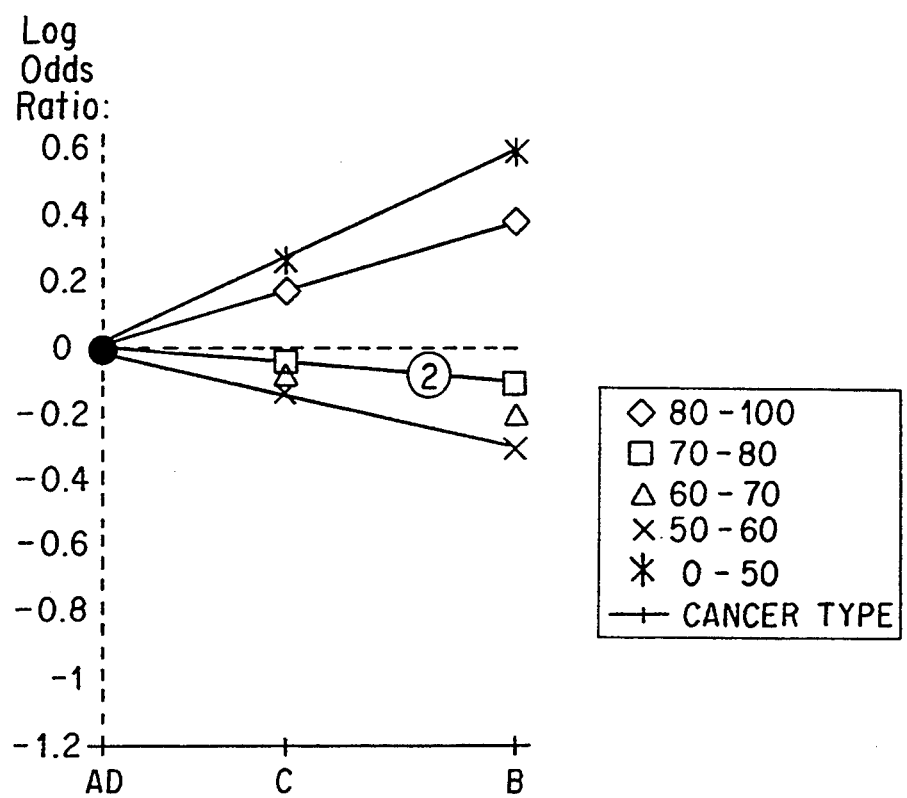

FIGS. 20 and 21 show the corresponding 1-component effects plots associated with FIG. 17. Outcome D is selected as the outcome reference, as it was in FIG. 17. Each of the 1-component plots has a single set of y-scores for the outcome categories. Hence, the outcomes are ordered according to these scores and the resulting plots are straight lines.

Figure 22:
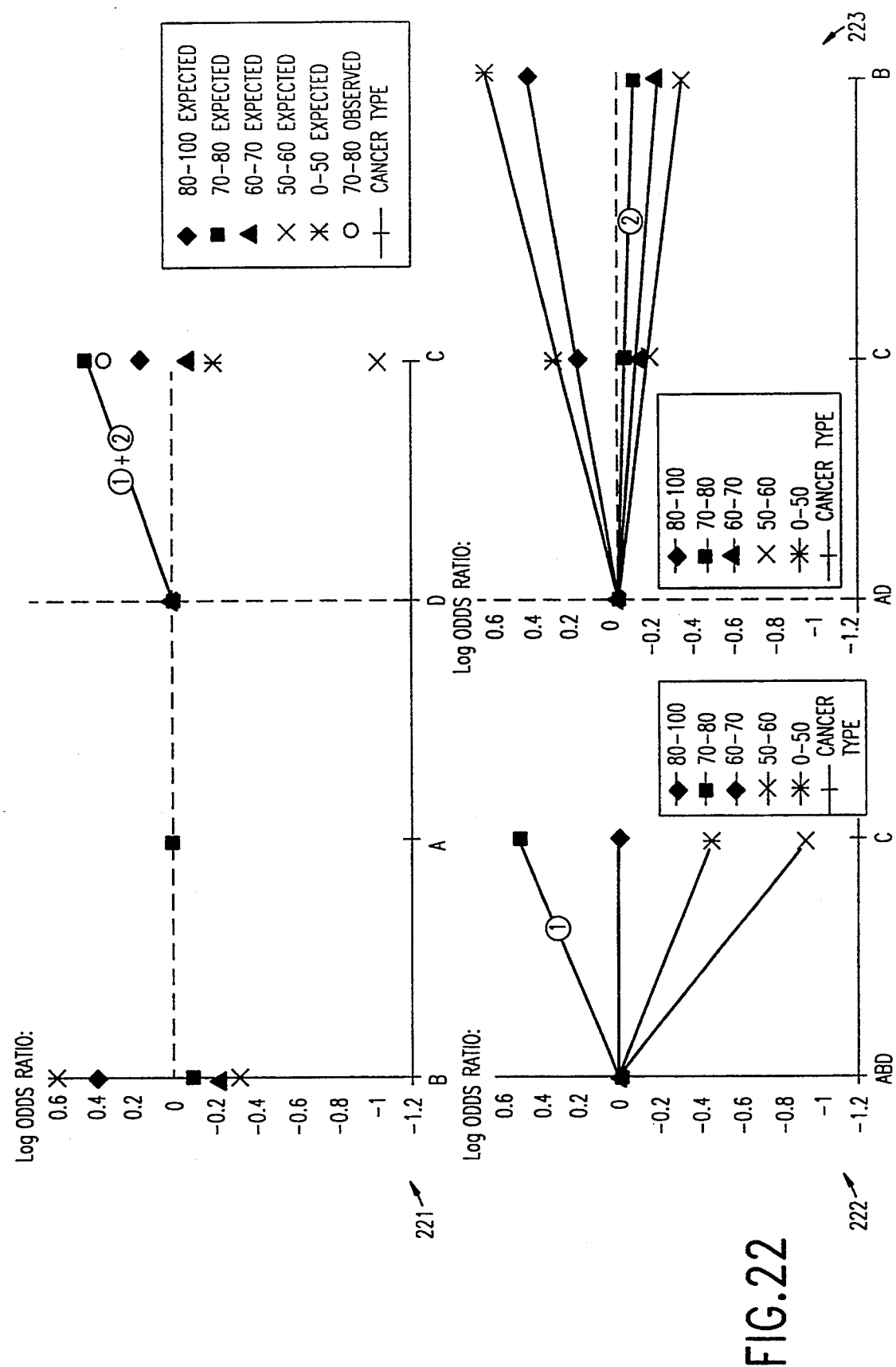

FIG. 22 presents FIGS. 17, 20, and 21, drawn to scale, in the same plot. It can clearly be seen by comparing "221", the 2-component plot with the corresponding 1-component plots (labeled "222" and "223" respectively, that the sum of slopes "1" and "2" in the 1-component plot, sum to the slope of the line labeled "1+2" in the upper block labeled "222". Decomposition into separate 1-component plots is important to identify the different factors associated with cancer. As a preferred embodiment, the invention will display simultaneously an M-component plot together with separate subcomponent plots in this manner.

Figure 23:
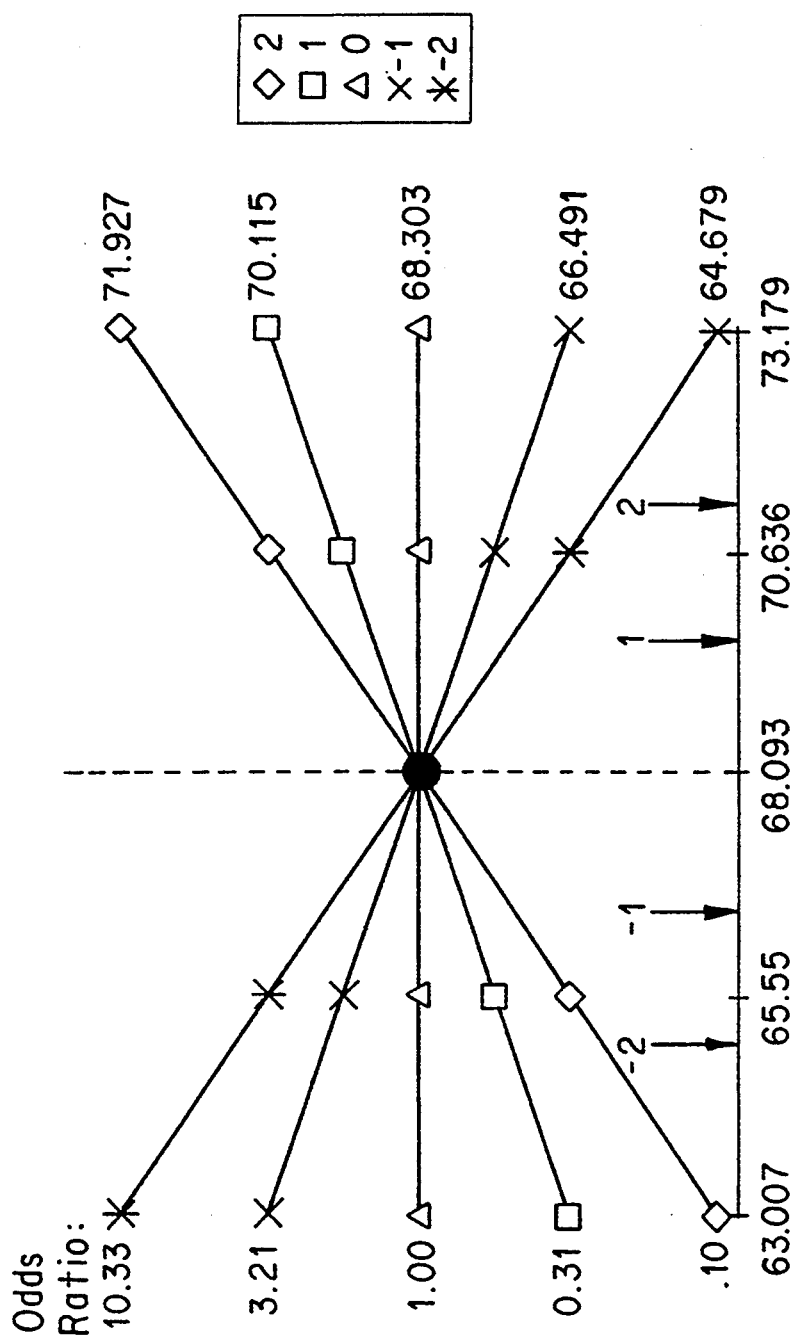
FIG. 23: Effects Plot Using Galton's Data for Predicting the Height of the Child as an Adult as a Function of Average Parent's Height

FIG. 23 presents a plot for continuous data where the outcome is the adult child's height, and the condition is the average height of the child's parents. Effects lines are shown for selected parent heights. The effects plot for continuous variables supplements the information present in the traditional straight line plot from a regression analysis. The condition and outcome references are selected to be the weighted averages.

It can clearly be seen for example, that as the parents height increases, so does the child's height. For example, for a parent height of approximately 6 feet (71.927 inches) the odds of a child achieving the height of 73.179 inches is 10.33 times as high as that of a child whose parents are of average height (i.e., the "average child"). The odds of that child achieving a height of only 63.007 inches is only 0.1 times as that of the "average" child.

Estimation algorithm

The estimation algorithms for association and correlation models are in the public domain. For example, fortran source code for estimating association models under the scoring algorithm and under the Newton-Raphson algorithm, as described in the Haberman 1994 algorithm, are available upon request form Prof. Shelby Haberman, at (708)-491-5081, or at Dept. of Statistics, Northwestern University, 2006 Sheridan Road, Evanston, Ill. 60208-4070. Documentation with the computer programs state "No restrictions exist concerning use of the enclosed materials". An alternative estimation algorithm was provided by Goodman (1979), as extended by Magidson (1992, 1993).

Two preferred embodiments for estimating the model parameters, the $\beta_i$ and $y_j$, and thus for obtaining predictions for $P_{j,i}$, $\Omega_{j,i}$, $\Psi_{j,i}$, and/or $F_{ij}$ and related quantities, are 1) Newton's elementary (univariate) method and 2) the scoring algorithm. The applicability of Newton's elementary method for estimating both correlation and association models was shown by Goodman (1979). Becker (1990) provided a fortran program for applying this approach to the general M-component association model.

The applicability of the scoring method was shown by Gilula and Haberman (1986), who also showed that it can be applied to multidimensional contingency table data in Gilula and Haberman (1988). The basic methodology was extended by Haberman (1994). The source code that is included in this application is based on the scoring algorithm.

All approaches utilize some standardizing restrictions to identify the $\beta_i$ and $y_j$ parameters (for each component). (When association models are in the form where $F_{ij}$ or $P_{ij}$ are expressed in terms of model parameters, there are more parameters than $\beta_i$ and $y_j$ but these are nuisance parameters that are ignored by and have no impact on the invention.)

Figure 2:
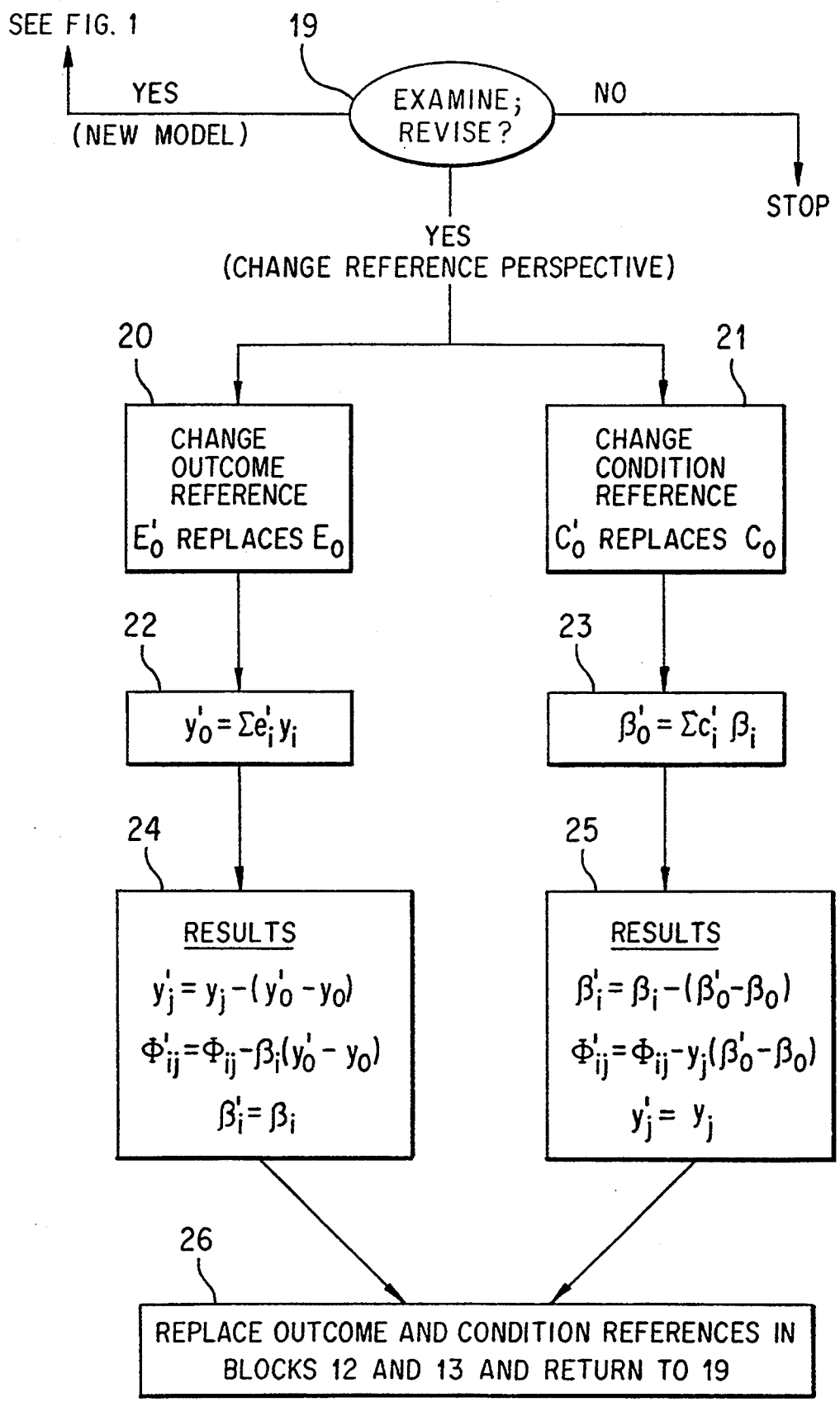

In addition, the particular standardizing restrictions that are chosen to estimate the model are only relevant towards obtaining the starting point (i.e., selection of the initial model, initial conditions and outcome references in FIG. 1). For purposes of illustration, suppose that for some component m, the $y_j$-scores have mean 0 and standard deviation 1, and the initial reference point is $(E_0, C_0)$, where $e_j = p_{+j}$, $j = 1, 2, \ldots, J$ and $c_i = 1/I$, $i = 1, 2, \ldots, I$. FIG. 2 shows how changes in the parameters and predictions are computed associated with a change to a new reference point, $(E'_0, C'_0)$, where $E'_j = \cdot(e'_1, e'_2, \ldots, e'_J)$ and $C'_j = \cdot(c'_1, c'_2, \ldots, c'_I)$.

If only the outcome reference condition changes, the slopes of the effects plots, the $\beta_i$, do not change at all.

That is, the new slopes, the $\beta'_i$, equal the original slopes, the $\beta_i$.

Without loss of generality, we will limit our discussion in this section to the 1-component model, since the general model is simply a summation of each of these components and each component is an independent model on its own. For the formal extension from the 1-component to the M-component model, see Becker (1990), Gilula and Haberman (1986, 1988), Goodman (1979) and Haberman (1994) which are hereby incorporated herein by reference.

Throughout we used the notation associated with categorical outcomes and categorical conditions. For simplicity, and without loss of generality, we will confine are attention here general notation for a continuous conditioning variable x and a continuous outcome variable y. The 1-component model turns out to be justified under the bivariate normal as well as other bivariate (and multivariate) distributions in the exponential family.

To see how it is justified under bivariate normality, for simplicity and without loss of generality take $\sigma_Y = \sigma_X = 1$, where $\sigma_Y$ and $\sigma_X$ are population standard deviations. It is well known that $\rho$ is the Pearson correlation between Y and X, and that $\rho$ is a parameter in the bivariate normal distribution. However, it is not well known that in addition to the population means and standard deviations, there is yet another parameter.

The bivariate normal (BVN) distribution can be expressed in several alternative forms. In terms of the probability density, used as a measure of likelihood, it is:

$$P_{Y,X}(y,x) = A_1 \exp\left(-\tfrac{1}{2}(1/1-\rho^2)\left[(x-\mu_x)^2 - \right.\right. \quad (6.1)$$

$$2\rho(x-\mu_x)(y-\mu_Y) + (y-\mu_Y)^2\right])$$

$$= A_1 \exp\left[(-\tfrac{1}{2}\phi/\rho)\left((x-\mu_x)^2 + \right.\right. \quad (6.2)$$

$$\left.\left.(y-\mu_Y)^2 - 2\rho(x-\mu_x)(y-\mu_Y)\right)\right]$$

$$= A_1 \exp(\phi\rho)\left[\Phi_{Y,X}(y,x) - \right. \quad (6.3)$$

$$\tfrac{1}{2}(x-\mu_x)^2 - \tfrac{1}{2}(y-\mu_Y)^2]$$

Alternatively, expressed in terms of the generalized odds ratio, or entropy (generalized log-odds ratio) it is:

$$\Theta_{Y,X}(y,x) \equiv \frac{P_{Y,X}(y,x)/P_{Y,X}(\mu_Y,x)}{P_{Y,X}(y,\mu_x)/P_{Y,X}(\mu_Y,\mu_x)} \quad (7)$$

$$\Phi_{Y,X}(y,x) \equiv \ln \Theta_{Y,X}(y,x)$$

$$= (\phi/\rho)(P_{Y,x}(y) - P_Y(y))/P_Y(y) \quad (8.1)$$

$$= \phi(x-\mu_x)(y-\mu_Y) \quad (8.2)$$

$$\text{where } A_1 = \frac{1}{\pi\sqrt{\rho/\phi}}, \text{ and } \phi = \rho/(1-\rho^2) \quad (9)$$

Solving eq. (7) for $P_{YX}(y,x)$, we obtain a distribution that is more general than BVN:

$$P_{YX}(y,x) = \frac{P_{YX}(y,\mu_x)P_{YX}(\mu_Y,x)}{P_{YX}(\mu_Y,\mu_x)} e^{[\phi(x-\mu_x)(y-\mu_Y)]} \quad (A1)$$

We note that model (A1) includes not only BVN but also a wide range of bivariate distributions in the exponential family (see e.g., Goodman, 1985), for both continuous and categorical variables.

From model (7) it follows that conditional on X, assessing the significance of the treatment effect. The various category of 1-component association models for two categorical variables may be classified as follows:

| 1-Component Association Models | TREATMENT | RESPONSE | Degrees of Freedom | |
|---|---|---|---|---|
| | | | FIT | SIGNIFICANCE |
| Zero-Association (Independence) | fixed = 0 | fixed = 0 | (I-1)(J-1) | 0 |
| XY-Association | fixed | fixed | IJ-I-J | 1 |
| X*Y-Association | free | fixed | (I-1)(J-2) | I-1 |
| XY*-Association | fixed | free | (I-2)(J-1) | J-1 |
| X*Y*-Association (RC-Model) | free | free | (I-2)(J-2) | (I-1) + (J-1)-1 |

$\Phi_{Y,X}(y,x)$ itself is perfectly correlated with Y. Hence, $\Phi_{Y,X}(y,x)$ can be used as a proxy for Y in a regression of Y on X. That is, any regression of $\Phi_{Y,X}(y,x)$ on X is equivalent to a regression of Y on X.

Taking the conditional expectation of eq. (8.2) with respect to X and solving for $E[Y-\mu_y|X=x]$ yields the simple form of what might be called a Universal regression model. It follows that for $x \neq \mu_x$ we have:

$$E[Y-\mu_Y|X=x,$$
$$(8)] = E_Y[\Phi_{Y,X}(y,x)|X=x]/\phi(x-\mu hd\ x)$$

The reason that this particular form of the Universal regression model is not defined for $X=\mu_x$ is that it is defined to assess changes relative to the mean as the condition reference.

In the case of BVN, it is well known that the regression of Y on X is linear in X:

$$E[Y-\mu_Y|X=x] = \beta(x-\mu_x)$$

or $$E[Y|X=x] = \mu_Y + \rho(x-\mu_x)$$

In this case, it follows that:

$$\rho_x = \rho(x-\mu_x)^2 \qquad (8.2)$$

Model (A1) reduces to BVN, under what we shall call the "linearity-of-regression" restriction, $\phi = \rho/(1-\rho^2)$. Thus, given continuous variables, the steps to produce an effects plot would be as follows:
 step 1: Estimate $\rho$.
 step 2: Under BVN, use the linearity of regression restriction to estimate $\phi$.
 step 3: Use eq. (8.2) to estimate $\Phi_{Y,X}(y,x)$.
 step 4: Use the Clogg and Eliasin (1987) algorithm for log-linear modeling with $\Phi_{Y,X}(y,x)$ as the starting values to obtain the "expected counts".

Note that when $\phi=0$, $P_{YX}(y,x)$ in (A1) is equal to the product of a term depending only on y, and a term depending only on x, which means that Y and X are stochastically independent. Under BVN, $\phi=0$ implies that $\rho=0$, and hence the well known result that zero correlation (under BVN) implies independence.

Categories of 1-Component Models for Two Categorical Variables

The maximum likelihood methodology allows the chi-square statistic for independence to be partitioned into the sum of two component chi-square statistics, one assessing the fit of the model, the other the significance of the treatment effect. When the model fits the data, the test of significance for the treatment has maximum power and therefore supercedes other approaches to assessing the significance of the treatment effect. The various category of 1-component association models for two categorical variables may be classified as follows:

For a given TREATMENT by RESPONSE 2-way table of observed frequency counts, the differences between one model and another can be interpreted geometrically in terms of the relative distance between the response categories and the relative distance between the treatment categories. In the Y-View of the effects plot, the response categories are represented by markers that are spaced along the horizontal axis. The relative spacing between these markers are controlled by the user. In the X-View of the plot, the treatment conditions are spaced along the horizontal axis. In both the Y- and X-View, the effects in terms of odds ratios are plotted on the vertical axis. When the odds ratios are plotted in logarithmic units, the treatment effects themselves appear as straight lines. In the Y-View, the slope of each straight line represents the effect of a given treatment condition. In the X-View, each line represents a different response category and the effect of a given treatment is represented by the points on each of these lines directly above the given treatment marker.

The zero-association model is the model of statistical independence. Under this model, because all of the odds ratios are 1 (i.e., all of the log odds ratios are zero), each treatment effect is nil. The zero model is expressed geometrically in an effects plot by each of the effects lines having zero slope as well as zero distance between each response category marker (in the Y-View) and zero distance between each treatment category marker (in the X-View). There are $(I-1)(J-1)$ degrees of freedom (df) associated with the test of fit for the independence model. Since no effects are estimated, there are 0 df available for testing significance of any treatment effects.

The XY-association model considers both the X-variable and the Y-variable to be fixed at given quantitative scores. In the special case that both X and Y are fixed at equidistant scores (such as integer scores), the model is called the uniform association model or U-model (Goodman, 1979). In this case, the spacing between adjacent response category markers (in the Y-View) and between adjacent treatment category markers (in the X-View) are fixed to be equidistant and the effects lines will also be equidistant to each other (i.e., the slopes of adjacent effects lines differ by a constant). Since there is only 1 treatment effect estimated by the XY-association model, there is 1 degree of freedom for the test of significance of this effect (i.e., the test that $\beta=0$). Hence, there are $(I-1)(J-1)-1$ df for testing the fit of this model.

To specify scores for either X and/or Y after the data has already been input, select "fixed" from the "model selection" menu box and a window will appear to allow you to change the then-current scores. To specify equidistant scores for X and/or Y, select "uniform" from the "model selection" menu box.

The X*Y-association model considers Y to be fixed at given quantitative scores (such as "ridits"), but X is considered to be a qualitative/categorical variable so that separate treatment effects are estimated for each treatment condition (i.e., the test that $\beta_i=0$). In the case that the response categories are assigned equidistant Y-scores, the model is called the column effects model or the C-model Goodman (1979). Since the scores are There is 1 df for each separate test of significance for each treatment condition, and there are I−1 df for the test that all treatment effects are nil. Hence, there are (I−1)(J−2) df for the test of fit for this model.

The XY*-association model considers X to be fixed at given quantitative scores (e.g., "dosage"), but Y is considered to be a qualitative/categorical variable and hence the score associated with each outcome is estimated by the method of maximum likelihood simultaneously with estimating the treatment effect. In the case that the treatment categories take on equidistant X-scores, the model is called the row effects model or the R-model Goodman (1979). Since the scores are estimated, there are J−1 df associated with the tests of significance for the treatment effect because separate effects are really being estimated for each of the J−1 response contrasts. Hence, there are (I−1)(J−2) df for testing the fit of this model.

The X*Y*-association model considers both X and Y to be qualitative/categorical and scores are estimated by maximum likelihood to determine the relative spacing for both. This model is called the row-column effects model or the RC model by Goodman (1979). Since treatment effects are estimated for each treatment condition and response scores are estimated, there are (I−1)+(J−1)−1 df associated with the tests of significance and hence (I−2)(J−2) df for assessing the fit of this model. To specify that scores for X and/or Y are free to be estimated (i.e., not fixed), select "free" from the "model selection" menu box While the power of the test for significance is diluted when response scores are estimated, if it is justified to use the XY* model, rather than the X*Y* model, then the XY model may be used to obtain a more powerful test the significance of the average treatment effect. Similarly, the X*Y model may always be used to obtain a more powerful test the significance of the average treatment effect.

In the case of k fixed quantitative predictor variables X(1), X(2), . . . , X(k), the model-based prediction for y may be implemented by multiplying each conventional partial regression coefficient, $\beta_A$, by $\phi_A/\rho_k$ (i.e., the ratio of the partial association parameter $\phi$, and the partial correlation parameter p). See e.g., page 27 for the "partial" coefficients) in the categorical case that result by applying these ratios. (Alternatively, y can be taken to be fixed at the observed quantitative values and x can be estimated.) In the case that x is fixed, $\beta$ increases linearly in x. For example, in FIG. 12, the difference in the slope of the effects lines associated with 60 and 70 year olds, is identical to the difference in the slope of the effects lines associated with 50 and 60 year olds. In the case that x is free, a separate $\beta$ is allowed for each value of x, and is not assumed to be linear in x.

When the y-score is taken as fixed, the distances between the outcome values is determined by these fixed scores. On the other hand, if the scores are free to be estimated, the relative distance between scores associated with two or more observations is determined by the model. For example, FIG. 6 shows the results of a model that successive outcome categories are equally spaced. This model was shown to fit the data because the observed points fall very close to the effects line. On the other hand, in FIGS. 7, 8, 9, 10 and 11, a model was used that specified that the y scores be estimated. For these data, a model that specified equidistant outcome categories was found to not fit the data.

More generally, any observed values of x and/or y can be taken to be free or fixed, and the algorithm provided by Magidson (1992), or by Haberman (1994) will estimate the free scores. Thus, the slope of the effects lines can be linear in x for a subset of the range of x. Each fixed score represents a restriction on the general model. However, as shown in FIG. 3 and the related discussion (see also Magidson, 1992 for a formalization of this identifiability issue) any two x scores (and any 2 y-scores) may be fixed to set the scale for the variable(s) scores without changing the model. That is, without changing the effects plot.

When the condition and/or outcome reference is changed from say the weighted average references (the standard form) to some other references, FIG. 2 shows how the model parameters change, and hence the effects themselves change because the questions are now asked from a different perspective. FIG. 3 and the discussion regarding FIG. 3 discussed the different interpretations associated with different reference points for a simple example in a 2×2 table.

Aside from determining whether the y and x scores are to be treated as free or fixed, other models can be specified. For example, setting $\beta-\beta_0=0$ is the model of statistical independence. For a multivariate conditioning variable, there are two or more x variables as in multiple regression. Separate plots can be presented for each partial effect (i.e., the effect of the first x and the effect for the second x variable, and a joint effects plot can be produced as well. FIG. 13 is the joint effects plot associated with a bivariate categorical conditioning variable. The separate partial effects plots are given in FIGS. 14 and 15.

Figure 12:
FIG. 12: Effects Plot for Continuous Conditioning Variable for Koch (1988) Data (Selected ages displayed: 23, 30, 41, 50, 60, 70)

In the case of a continuous conditioning variable, the specific x-values must be specified to be plot, because there are an infinity of possible values (see e.g., FIGS. 12 and 23). On the other hand, for categorical conditions, one, some, or all may be displayed.

If the model does not fit the data, even when both the y and x scores are estimated, then it is necessary to add a second, and possibly more components. FIGS. 16, 17, 18, 19, 20, 21 and 22 and the related discussion described this situation.

Preliminary Embodiment for Implementation of Algorithm

Data source

Executing the File|New . . . command sets up the program for a new model. A dialog box appears from which an external data source is selected. The selection of a data source is followed by the setup of the model proper by choosing the model variables and presetting model options in the Model dialog box. The Model Dialog box appears after the command Model|New . . . is chosen.

Model Setup

The Model Dialog box defines the model variables and sets initial conditions. The variable to be selected are:

Frequency variable ($f_{ij}$)

Weight variable (used as start values $Z_i$ and $Z_0$)

Dependent variable (specify which variable is dependent variable)

Designate conditioning variables (optionally, select single predictor for first analysis)

Other settings:

Predictor type (estimate score or treat as fixed (quantitative))

Dependent and predictor variable scores (to apply when variable is used as a fixed quantitative variable)

Algorithm Implementation

After the model variables and options have been set, the model can be estimated. "Estimation" of the model actually involves the sequential fitting of three different models: the Independence model ("type 0" with no dependent variable involved), a dependent variable with fixed scores ("type 1"), and finally a model with dependent variable scores not fixed ("type 2", and sometimes also referred to as "calibration"). The data structure which stores the model settings and results generally provides a separate storage space for each of the 3 model types. A preferred embodiment is to use Goodman's (1979) algorithm as modified by Magidson (1992).

Before the algorithm that fits each model can be invoked, the model parameters must be initialized. There is a one time primary initialization preceding any estimation and also an initialization of smaller scope preceding each of the three sub-models.

The estimation algorithm is iterative, and terminates when user-specified conditions are reached. Each iteration of the algorithm invokes up to 4 different parameter adjustment procedures (depending on the sub-model type at hand). After each adjustment procedure, a new set of Expected counts is computed for use by any following adjustment procedure.

Data Structure Summary (source listing exl_wset.h, type XL_MDL)

Each model to be estimated has a region of core allocated for its use. This structure retains the results of all three sub-model estimations. The table of expected counts is not retained, instead the parameters necessary to compute the table are stored (i.e., in the Goodman (1979) notation, the Alpha, Beta, Gamma, and the dependent and predictor variable scores.) Routines, such as "views" which show the results of the estimation to the user and which need expected counts call a subroutine to compute the counts as needed.

The table of observed counts is maintained in core. Each row of the table is self-identifying with a vector of integers which correspond to the predictors in the model. Each row contains a vector of counts corresponding to the levels of the dependent variable with one extra cell allocated for use as a row total. The Alpha parameters are also stored with each table row. The routines which construct the table eliminate rows with all zeroes in their count cells.

Initialization

Primary Initialization –

Storage is allocated and parameters are set to initial values. The coordination of the procedure calls is made from procedure ExL_Estimate_Init(). The parameters initialized are:

Alpha: preset to contain the total observed count in the corresponding table row. (function InitAlpha())

Beta: preset to 1.(procedure InitBeta())

Gamma: preset to 1. Fixed-score (or quantitative) predictor scores are preset to score values derived from either the external data source or user entered values. The values are then standardized by subtracting their (weighted) average. (function InitGamma())

Yterm: preset to user-entered scores (via Model Dialog Box) or scores derived from the external data source. The scores are then standardized by subtracting their (weighted) average. (function InitYterm())

Secondary Initialization. (function ExL_ExlInit())

Before the estimation of each sub-model, an additional initialization step occurs. This initialization presets the model parameters to values computed for the "logically" preceding model. (The "preceding" model must be a restricted form of the current model.) For type 0, no additional computation is performed (or possible). The type 1 parameters are preset to the values obtained for the Alpha and Beta parameters computed for type 0. The type 2 parameters are preset to the values obtained for the type 1 model.

Note that "normal" estimation expects the three models to be estimated in order. The type 0 model is always estimated. It is possible for the user to skip the estimation of the type 1 parameters and proceed directly to type 2, in which case the initial parameter estimates will be as outlined for Primary Initialization.

Estimation

The set of procedures controlling model estimation can be viewed as a three level hierarchy. At the top level is a routine which loops until the model parameters indicate convergence or until an iteration limit is reached (procedure ExL_Estimate()). At the next lower level is procedure ExL_Iter1(). This routine is responsible for calling the parameter adjustment routines appropriate to the sub-model at hand. After each parameter adjustment, the (virtual) expected count table is updated for use by the next adjustment procedure (procedure AdjustF()). The ExL_Iter1 routine is responsible for "yielding" to the Windows environment to allow the user to switch away to another task. At the lowest level are the parameter adjustment routines, and the routine responsible for the computation of the expected counts.

The primary computation routines called from ExL_Iter1 are:

| Sub-model: | type 0 | type 1 | type 2 |
|---|---|---|---|
| | Alpha() | Alpha() | Alpha() |
| | — | Gamma() | Gamma() |
| | Beta() | Beta() | Beta() |
| | — | — | Calibrate() |

Each sub-model estimated has an associated model fit chi-square statistic. The chi-square statistic used in the current program is the likelihood ratio chi-square. The chi-square is calculated in the AdjustF() procedure.

Algorithm Routines (See Listing mdl_cntl.c)

ExL_Iter1()

Perform the calls necessary for one iteration. "Yield" to Windows.

ExL_Estimate_Init()

Coordinate primary initialization following the allocation of a new Model structure. After the various Init*() routines have been called, the type 0 sub-model is estimated by calling ExL_Iter1().

ExL_Estimate()
Calls ExL_Iter1() until convergence or iteration limit reached.

ExL_IndSigf()
Called after ExL_Estimate to estimate the individual significance of each independent variable. The routine operates in manner similar to ExL_Estimate(), however an additional indicator variable is used to identify the predictor for which significance is being computed.

ExL_FirstModelSetup()
Construct table of observed counts for model, call ModelNew().

ExL_NextModelSetup()
Construct table of observed counts for model, call ModelNew(). Uses information in existing model to make construction of next model more efficient.

ExL_DeleteModel()
Returns a model's core to the free store.

ModelFree()
Return allocated core to free store.

ModelReplace(),ModelCurr(),ModelFirst()
Manage list of allocated models

ModelNew()
Allocate core for a model; initialize some option values (e.g., iteration limit, epsilon)
See Listing mdl.c GetExpCnts()
Generate one row of expected counts. The row total is computed. Also returns the Gamma product for use by Calibrate().

AdjustF()
Generate all rows of the expected count table. Overall column totals are summed, as is the LR chi-square statistic. A deviation quantity is returned for the caller to use in deciding whether convergence has been achieved.

Alpha()
Adjust Alpha parameter. The Alpha parameters are stored with the table of observed counts.

Gamma()
Adjust the Gamma parameters. Two types of Gammas are adjusted those associated with flee-score predictors and those associated with fixed-score or quantitative predictors. The quantitative predictors will have a corresponding non-NULL pointer to their (fixed,- standardized) scores; the free predictors will have a corresponding NULL pointer.

lnGamma()
Called after Gamma() to update the lnGamm vectors. These vectors are used by external view windows to show model results.

Calibrate()
Called for type 2 sub-models to adjust the Yterm parameter. After the Scores vector is adjusted, they are copied to the Yterm vector and re-standardized.

Beta()
Adjust the Beta parameter using the overall table column totals.

PushMdlParam()
Save a set model parameters. Used while estimating predictor significance.

PopMdlParam()
Restore a set of model parameters. Used while estimating predictor significance.

InitBeta()
Set all Beta parameters to 1.

InitGamma()
Set any free-score predictor Gammas to 1. Set any fixed-score predictor Gammas to their score values by reference to the Scan tables derived from the external data source. The scores values are standardized.

InitAlpha()
Set each Alpha parameter equal to the corresponding row total.

InitScores()
Transfer scores entered from the Model Dialog box to the Scores vectors. If no such user-specified scores, obtain the scores from the Scan tables derived from the external data source.

InitYterm()
Copy the Scores vector to the Yterm vector. Standardize by subtracting the weighted average. Also update the Scaled vector, which has min=0.0 and max=1.0 for use by external view windows.

InitModel()
Zero overall table totals.

ExL_EstInit()
Copies results of a preceding sub-model to the parameter vectors of a model to be estimated, if possible.

Preferred embodiment for Implementing Effects Plot
A Preferred embodiment for implementing the effects plot is as follows:

Plot Operation
The plot consists of the following regions
Window frame
Plot title
Left vertical axis
Right vertical axis, with condition legend
Plot frame
Bottom axis
The plot has of the following parts:
Indicators for each outcome level showing the relative magnitude of the outcome scores by their position along the bottom horizontal axis.
expected effects lines derived from the expected odds ratio table.
A vertical reference axis.
A horizontal reference axis.
Indicators for each condition, showing the projection onto the outcome axis of the expected outcome score for that condition.
observed points derived from the observed odds ratio table.
The following plot parts respond to user manipulation (by a mouse click):
Outcome score indicators may be selected and dragged to change the associated score value.
Expected effects lines: selection causes identification of line and description of its characteristics to appear in a subsidiary window.
Additional user control
Selection of reference method, independently by axis:
Specific category.
Uniform weights for each category.
Weighted in proportion to the observed category counts.

User-specified custom weights.

Ordering of axis levels, independently by axis: normal or reverse.

The plot operates in an "event-driven" computer environment (Microsoft Windows 3.1). The plot software consists of various cooperating routines that handle specific events. These events originate from different places. Some are direct consequences of user manipulations (mouse clicks, key presses); others originate as the result of computations by the cooperating routines (e.g., at the conclusion of a model estimation iteration, a refresh message may be sent to the plot.) These events are handled in three main sections.

Size Event (CExlPltView::SetSize)

The size of the window has changed or the window has been created. The primary routine computes the sizes of the various regions that make up the plot window. The routine selects an appropriately sized text font; all other region sizes are then computed using the metrics of the selected font. For example, the size of the left and right axis sections is computed by determining the width of the dependent and predictor variable and category labels.

Data Event (CExllPltView::Build)

The underlying model data has changed (e.g. from the execution of one model estimation iteration), or, a reference specification has been changed by the user. A current set of model parameters must be obtained and the configuration of the plot components must be re-computed.

The model parameters (the outcome y's, and the condition g's, using the Goodman 1979 notation) as well as the observed counts are obtained from the CModel class. The y's and g's, suitably transformed according to the current reference settings, are used to compute the expected odds-ratios. (The logarithm of the transformed g's are also referred to as betas throughout this application.) The observed counts are converted to observed odds ratios, also according to the current reference settings. The minimum and maximum odds ratios (of either type) are identified. The minimum will be assigned to the bottom of the plot surface rectangle, the maximum to the top. All other values assigned to positions between the two extremes by linear interpolation. These provide all the needed vertical coordinates for plot components.

The horizontal coordinates to be assigned to each column of the odds ratio tables are established by reference to the y's of the estimated model. Again the minimum and the maximum are identified: these are assigned the left and right extremes of the plot surface. The remaining values are linearly scaled to fall in between the two extremes. These scaled values provide the horizontal coordinates for the odds ratio values. These horizontal coordinates also provide the location of the active score indicators.

The positions of the average outcome score indicators are obtained from a transformation of the beta's. The values obtained are interpreted as having the same units as the outcome y values and are assigned coordinates using the linear scaling constants used for the assignment of the y values coordinates.

Having computed the necessary coordinate values, the components of the plot are constructed as "graphical objects." These objects record the position of the component, and the type of drawing operation that will be employed to render the object on the screen. For example, the expected odds-ratios are stored as Line objects; the observed odds-ratios are stored as Symbol objects. These "objects" are stored in a list which is referenced when drawing operations are required.

User Events

Control Manipulation (CExlView)

Associated with the plot is a control window which allows the selection of 1) the spacing of the model scores, and 2) the reference type. An additional control specifies whether the outcome dimension (dependent variable) or condition dimension (predictor) is affected. The results of these control settings are stored in the CExlView class. As changes are made, messages ("events") are sent to notify the cooperating routines of the changes.

Plot Component Manipulation (CExlPltView)

Two components of the plot respond to mouse clicks: 1) the outcome indicators and 2) the expected odds ratio lines. Once selected, an outcome indicator may be dragged along its axis. As its position changes, a proportionate change is made to associated score value; the model may then be re-estimated using this new score value. Selecting, or clicking on, an expected odds ratio line causes information and interpretation of the selected line to appear in a subsidiary window.

Software Organization
    class CModel
    class CView
        class CPlotView
            OnSize
            OnUpdate The CModel class estimates the model parameters.

The CView class manages the external representation to the parameters computed by CModel. For example, the reference settings are maintained in a CView class.

The CPlotView manages the plot.

The preferred embodiment has the following general structure:

```
// exlview.h : base class for all model views
// mainly to consolidate reference settings
//
///////////////////////////////////////////////////////
// CExlView view
// tool bar control indices
enum EDB_ctls { EDB_DIMN=0, EDB_SPACING,
EDB_REFER, EDB_ORDER, EDB_ESTIMATE,
EDB_NCTL };
// reference settings ( > = 0 are all "REF_ABSCAT" and also
identify category)
enum Erefer { REF_NONE = -1, REF_WEIGHTED = -4,
REF_UNIFORM = -3 , REF_CUSTOM = -2,
REF_ABSCAT = 0 };
class CExlView : public CView
{
public:
    int nthView;   // for window title
    BOOL bInit;    // to suppress draw stuff until appropriate
    CDialog* viewCtl;  // associate control window
    (NULL= none visible)
    int dimncurr;  // for init of control window
protected:
    Erefer yRefer;  // dependent reference
    CRealArray yRefWt;
    CRealArray yRefStnd;  // ( = REF_WEIGHTED
    proportions)
    Erefer xRefer;  // predictor reference
    CRealArray xRefWt;
    CRealArray xRefStnd;  // ( = REF_WEIGHTED
    proportions)
public:
    virtual BOOL ViewTitle( CString& );  // for use by
    associate control
    virtual BOOL ViewMenu( CMenu& );  // (can't make this
    work right)
```

```
    Erefer GetRefWgts( int dimn );
    const CRealArray*
        GetRefWgts( int dimn, Erefer* );
    Erefer SetRefWgts( int dimn, Erefer ne, LPARAM lP );
    void InitMdlCtls( CPtrArray& );
    void OnViewChange( CPtrArray& );
    void OnDimnChange( CPtrArray& );
    void OnSpacingChange( CPtrArray& );
    void OnReferChange( CPtrArray& );
protected:
    DECLARE_DYNCREATE(CExlView)
    CExlView();
    virtual ~CExlView();
    virtual void PostNcDestroy();
    virtual void OnInitialUpdate();
    virtual void OnActivateView( BOOL bActivate, CView*
    pActivateView, CView* pDeactiveView );
    virtual void OnDraw(CDC* pDC);   // overridden to draw
    this view
    // Generated message map functions
    protected:
    //{{AFX_MSG(CExlView)
    afx_msg void OnRButtonDown(UINT nFlags, CPoint point);
    afx_msg void OnClose();
    afx_msg void OnUpdateViewControl(CCmdUI* pCmdUI);
    //}}AFX_MSG
    DECLARE_MESSAGE_MAP()
};
/////////////////////////////////////////////////////////////
// plotview.h : header file
//
/////////////////////////////////////////////////////////////
// CExlPltView view
class CDlgPlotCtl;
class CExlPltView : public CExlView
{
protected:
    // various drawing toolss . . .
    CPen penDflt;
    CPen penRefer;
    CPen penAvg;
    CBrushbrshDflt;
    CBrushbrshRefer;
    CFontfntText;
    CFontfntSymb0;
    CSizesizText;   // size of fntText
    // various region dimensions and locations
    CRectrctClient;
    int  wLeft;
    int  wPlot;   // plot surface width
    int  wRight;
    int  hPlot;   // plot surface height (nb: may be negative . . . )
    CRectrctTopLeft;
    CRectrctTitle;   // (top center)
    CRectrctTopRight;
    CRectrctLeft;
    CRectrctRight;
    CRectrctBottom;
    CRectrctPlot;   // in middle somewhere . . .
    CPtrList drawlist;// objects to draw . . see CPShape in
    pltshape.h/.cpp
    CRealArrayytrm;   // obtained from CModel
    CRealArraybeta;   // obtained from CModel (where it is
    known as gamma)
    CRealArrayobsPts;   // obtained from CModel
    CIntArrayyrank;   // ordering of ytrm
    CStringArray* ylbls;
    CStringArray* xlbls;
    BOOL  bLeftTicks,bRightTicks;
    BOOL  bXnorm, bYnorm;   // normal/reverse ordering
    void OddsRatio( Real* O, const CRealArray& x, const
    CRealArray& y );
        // compute odds-rations from counts
public:
    virtual BOOL ViewTitle( CString& );
    BOOL NrmlOrder( int );
    void NrmlOrder( int,BOOL );
protected:
    DECLARE_DYNCREATE(CExlPltView)
    CExlPltView();
    ~CExlPltView();
    virtual void OnInitialUpdate();
    virtual void OnUpdate( CView *pSnd, LPARAM lHint,
    CObject* pHint );
    void SetSizes();   // compute region sizes
    void CopyData();   // obtain paramaters from CModel,
    parent class
    void Build( CModel* );// construct plot objects
    void Draw( CDC& dc, CPoint* org );
    virtual void OnDraw(CDC* pDC);   // overridden to draw
    this view
    virtual void OnPrepareDC( CDC *dc, CPrintInfo *pi );
    virtual BOOL OnPreparePrinting( CPrintInfo * );
    // Generated message map functions
    //{{AFX_MSG(CExlPltView)
    afx_msg void OnViewControl();
    afx_msg void OnSize(UINT nType, int cx, int cy);
    afx_msg void OnViewUpdate();
    //}}AFX_MSG
    DECLARE_MESSAGE_MAP()
#ifdef _DEBUG
    void Dump(CDumpContext&) const;
#endif
};
/////////////////////////////////////////////////////////////
```

CONCLUSION

Presented above is a demonstration that statistical effects of different conditions can be the subject of surprisingly powerful graphical displays. Moreover, a similar display format may be utilized regardless whether the outcome is continuous or categorical in nature and regardless whether the condition or conditions are continuous or categorical in nature. The display of effects can show the relative contributions to outcome of each of a number of conditions. The display can be presented in the Y-View where the outcome markers are displayed on the horizontal axis; or, the if the rows and columns of the input data matrix are transposed before performing the calculations, the display becomes the X-View where the markers displayed on the horizontal axis are associated with the conditions.

The outcome may be multivariate in nature and the conditions themselves may be multivariate in nature. In the case of multivariate conditions, additional displays can be utilized to show the separate effects of each of the multivariate factors. The manner in which the displays may be created using a suitable computer program has been described above. As described, the program may utilize public domain algorithms to derive critical parameters utilized in creating the display. When the computer program is loaded into a computer, the result is a new and powerful device for creating new graphical displays of statistical effects.

REFERENCES

These references are hereby incorporated herein by reference.

Anderson, J. A., (1984). "Regression and Ordered Categorical Variables (with discussion)," *Journal of the Royal Statistical Society, Series B.* 46, 1–40.

Becker, M. P. (1990). "Maximum Likelihood Estimation of the RC(M) Association Model," *Applied Statistics.* 29, 152–166.

Clogg, C. and Shihadeh, E., (1994). *Statistical Models for Ordinal Variables.* Thousand Oaks, Calif.: Sage.

Clogg, C and Eliason, S. R., (1987). "Some Common Problems in Log-linear Analysis," *Sociological Methods and Research,* 16, 8–44. [Reprinted in J. Scott Long (Ed.) (1988), *Common Problems/proper Solutions* (pp 226–257). Newbury Park, Calif.: Sage.

Duncan, O. D. and McRae, J. A., (1979). "Multiway Contingency Analysis with a Scaled Response or Factor," *Sociological Methodology* San Francisco: Jossey-Bass.

Gilula, Z., and Haberman, S. J. (1988). "The Analysis of Multivariate Contingency Tables by Restricted Canonical and Restricted Association Models," *Journal of the American Statistical Association,* 83,760–761.

(1986). "Canonical Analysis of Two-Way Contingency Tables by Maximum Likelihood," *Journal of the American Statistical Association,* 81,780–798.

Goodman, Leo A. (1991). "Measures, Models and Graphic Displays in the Analysis of Cross-Classified Data," (with discussion). *Journal of the American Statistical Association,* 86, 1085–1138.

(1985). "The Analysis of Cross-Classified Data Having Ordered and/or Unordered Categories: Association Models, Correlation Models, and Asymmetry Models for Contingency Tables With Or Without Missing Entries," *The Annals of Statistics,* Vol. 13, No. 1,10–69.

(1984). *The Analysis of Cross-Classified Data Having Ordered Categories,* 1984, Harvard University Press.

(1983). "The Analysis of Dependence in Cross-Classifications Having Ordered Categories, Using Log-Linear Models for Frequencies and Log-Linear Models for Odds," *Biometrics,* 39, 149–160, reprinted in Goodman (1984).

(1979). "Simple Models for the Analysis of Associations in Cross-Classifications Having Ordered Categories," *Journal of the American Statistical Association,* 74,537–552, reprinted in Goodman (1984).

(1978). with Jay Magidson (ed). *Analyzing Qualitative/Categorical Data,* University Press of America.

Haberman, Shelby (1994). "Computation of Maximum Likelihood Estimates in Association Models," *Journal of the American Statistical Association,* August 1994 (forthcoming).

Ishii-Kuntz, M. (1994). *Ordinal Log-linear Models.* Sage University Paper series on Quantitative Applications in the Social Sciences, 07–097. Thousand Oaks, Calif.: Sage.

Larsen, Richard J, and Marx, Morris L. (1986). *An Introduction to Mathematical Statistics and Its Applications.* Englewood, N.J.:Prentice Hall.

Magidson, Jay (1992). "Chi-squared Analysis of a Scalable Dependent Variable," *Proceedings of the 1992 annual meeting of the American Statistical Association,* Section on Statistical Education.

(1993). *SPSS for Windows CHAID Release 6.0 Manual,* Chicago: SPSS Inc.

(1981). "Qualitative Variance, Entropy, and Correlation Ratios for Nominal Dependent Variables," *Social Science Research,* 10, 177–194.

Stigler, Stephen M. (1986). *This History of Statistics, The Measurement of Uncertainty before* 1900, Cambridge: Harvard University Press.

What is claimed:

1. A device for graphical display of statistical effects of different conditions $C_i$ ($i=1,\ldots,J$) on a categorical or continuous outcome E, based on a matrix A associating observed outcomes $E_j$ ($j=1,\ldots,J$) with conditions $C_i$, the device comprising:

(a) matrix storage means for storing the values from Matrix A provided as an input;

(b) calculating means for calculating, using a selected model, the slope of the linear plot of the relative likelihood $\Psi_{j,i}-\Psi_{j,0}$ as a function of a score $Y_j$ associated with each outcome $E_j$ for a given one of the conditions $C_i$ in relation to the given condition reference $C_0$ and a given outcome reference $E_0$;

(c) output means for providing a graphical output plotting each $\Psi_{j,i}-\Psi_{j,0}$ as a function of $y_j$ for the given $C_i$.

2. A device according to claim 1, further comprising: means for substituting a new condition reference $C'_0$ for the given condition reference $C_0$, so that the device may provide a new graphical output of statistical effects in relation to the new condition reference $C'_0$ and the given outcome reference $E_0$.

3. A device according to claim 1, further comprising: means for substituting a new outcome reference $E'_0$ for the given outcome reference $E_0$ so that the device may provide a new graphical output of statistical effects in relation to the given condition reference $C_0$ and the new outcome reference $E'_0$.

4. A device according to claim 1, further comprising: prediction means for determining the expected outcome score associated with the given condition $C_i$; and wherein the output means includes means for displaying the expected outcome score on the graphical output.

5. A device according to claim 4, wherein the prediction means includes means for determining the expected outcome score as a model-based expectation.

6. A device according to claim 4, wherein the prediction means includes means for determining the expected outcome score as the conventional probability-based conditional expectation.

7. A device according to claim 1, further comprising: model assessment means for calculating, using a new model, the new relative likelihood quantity, $\Psi'_{j,i}-\Psi'_{j,0}$ as a function of any given score $y_j$ associated with the previously selected model for a given condition $C_i$ in relation to the given condition reference $C_0$ and outcome reference $E_0$; and wherein the output means includes means for displaying on the graphical output the new quantity determined for the given $y_j$, so that assumptions imposed by the selected model may be visually evaluated.

8. A device according to claim 1, further comprising: processing means for determining the effects of a given condition as contributions from a plurality of factors collectively constituting the condition; and wherein the output means includes means for plotting separately the contribution of each factor as a partial effect in a display similar to that of the given condition, so that the sum of the slopes of the partial effects lines equals the slope of the effects line for the given condition.

9. A device according to claim 8, further comprising: prediction means for determining the expected partial outcome score associated with a given factor; and wherein the output means includes means for displaying the expected partial outcome score in the display.

10. A device according to claim 9, wherein the prediction means includes means for determining the expected outcome score as a model-based expectation.

11. A device according to claim 10, wherein the outcome E is continuous.

12. A device according to claim 10, wherein the outcome E is categorical.

13. A device according to claim 9, wherein the prediction means includes means for determining the expected outcome score as the conventional probability-based expectation.

14. A device according to claim 13, wherein the outcome E is continuous.

15. A device according to claim 13, wherein the outcome E is categorical.

16. A device according to claim 9, wherein the outcome E is continuous.

17. A device according to claim 9, wherein the outcome E is categorical.

18. A device according to claim 1, wherein the outcome E is continuous.

19. A device according to claim 1, wherein the outcome E is categorical.

20. A device for graphical display of statistical effects of different conditions $C_i$ ($i=1, \ldots, I$) on a categorical or continuous outcome E, based on a matrix A associating conditions $C_i$, ($i=1, \ldots, I$) with observed outcome $E_j$, the device comprising:
   (a) matrix storage means for storing the values from Matrix A provided as an input;
   (b) calculating means for calculating, using a selected model, the slope of the linear plot of the relative likelihood $\Psi_{j,i} - \Psi_{j,0}$ as a function of a score $x_i$, associated with a corresponding one of the conditions $C_i$, for a given outcome $E_j$ in relation to the given condition reference $C_0$ and a given outcome reference $E_0$;
   (c) output means for providing a graphical output plotting each $\Psi_{j,i} - \Psi_{j,0}$ as a function of $x_i$ for the given $E_j$.

21. A device according to claim 20, further comprising:
   means for substituting a new condition reference $C'_0$ for the given condition reference $C_0$, so that the device may provide a new graphical output of statistical effects in relation to the new condition reference $C'_0$ and the given outcome reference $E_0$.

22. A device according to claim 20 further comprising:
   means for substituting a new outcome reference $E'_0$ for the given outcome reference $E_0$ so that the device may provide a new graphical output of statistical effects in relation to the given condition reference $C_0$ and the new outcome reference $E'_0$.

23. A device according to claim 20, further comprising:
   model assessment means for calculating, using a new model, the new relative likelihood quantity, $\Psi'_{j,i} - \Psi'_{j,0}$ as a function of any given score $x_i$ associated with the previously selected model for a given outcome $E_j$ in relation to the given condition reference $C_0$ and outcome reference $E_0$; and
   wherein the output means includes means for displaying on the graphical output the new quantity determined for the given $x_i$; so that assumptions imposed by the selected model may be visually evaluated.

24. A device according to claim 20, further comprising:
   processing means for determining the effects of a given condition as contributions from a plurality of factors collectively constituting the condition; and
   wherein the output means includes means for plotting separately the contribution of each factor as a partial effect in a display similar to that of the given outcome, so that the sum of the slopes of the partial effects lines equals the slope of the effects line for the given outcome.

25. A device according to claim 20, wherein the outcome E is continuous.

26. A device according to claim 20, wherein the outcome E is categorical.

* * * * *